(12) United States Patent
Miyawaki

(10) Patent No.: US 11,858,011 B2
(45) Date of Patent: Jan. 2, 2024

(54) DEVICE, CLEANING SYSTEM, AND METHOD OF DETERMINING WHETHER OR NOT TO CLEAN WORK AREA OF MACHINE TOOL

(71) Applicant: Fanuc Corporation, Yamanashi (JP)

(72) Inventor: Masanao Miyawaki, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 327 days.

(21) Appl. No.: 17/079,692

(22) Filed: Oct. 26, 2020

(65) Prior Publication Data
US 2021/0142458 A1    May 13, 2021

(30) Foreign Application Priority Data
Nov. 13, 2019    (JP) .................... 2019-205670

(51) Int. Cl.
| | |
|---|---|
| *B08B 3/02* | (2006.01) |
| *B08B 13/00* | (2006.01) |
| *G06T 7/00* | (2017.01) |
| *B08B 5/02* | (2006.01) |
| *G06V 10/50* | (2022.01) |
| *G06V 10/56* | (2022.01) |
| *G06V 20/10* | (2022.01) |

(52) U.S. Cl.
CPC .............. *B08B 13/00* (2013.01); *B08B 3/02* (2013.01); *B08B 5/02* (2013.01); *G06T 7/001* (2013.01); *G06V 10/50* (2022.01); *G06V 10/56* (2022.01); *G06V 20/10* (2022.01); *G06T 2207/30164* (2013.01)

(58) Field of Classification Search
CPC . G06T 7/001; G06T 2207/30164; B08B 3/02; B08B 5/02; B08B 13/00; B08B 3/024; G06V 10/50; G06V 10/56; G06V 20/10; G06V 20/00; G06V 2201/00; B05B 12/12; B05B 13/0431; B05B 15/65; B23Q 11/005; B23Q 17/2452; B23Q 17/249; B23Q 11/00; B25J 11/0085; G05B 19/406

See application file for complete search history.

(56) References Cited

U.S. PATENT DOCUMENTS

| | | | | |
|---|---|---|---|---|
| 2015/0009296 | A1* | 1/2015 | Crona | .................. H04N 13/239 |
| | | | | 348/47 |
| 2017/0144262 | A1* | 5/2017 | Okuda | ............... B23Q 11/1076 |

FOREIGN PATENT DOCUMENTS

| | | | |
|---|---|---|---|
| JP | 10118884 A | 5/1998 | |
| WO | WO-2004071681 A1 * | 8/2004 | ............... B08B 3/00 |

* cited by examiner

*Primary Examiner* — Erin F Bergner
(74) *Attorney, Agent, or Firm* — RatnerPrestia

(57) ABSTRACT

A device capable of determining whether or not to clean a work area of a machine tool with higher accuracy. The device includes an imaging device configured to capture first image data of the work area before machining, and configured to capture second image data of the work area after machining, an image data generation section configured to generate third image data indicating a degree of change between brightness of a pixel of the first image data and brightness of a pixel of the second image data, and a determination section configured to determine whether or not to clean the work area based on a histogram indicating a relationship between the brightness of the pixel of the third image data and the number of pixels of the third image data.

7 Claims, 21 Drawing Sheets

| | $x_n$ | $x_{n+1}$ | $x_{n+2}$ | $x_{n+3}$ | $x_{n+4}$ |
|---|---|---|---|---|---|
| $y_n$ | 100 | 120 | 120 | 100 | 110 |
| $y_{n+1}$ | 100 | 150 | 200 | 200 | 180 |
| $y_{n+2}$ | 80 | 150 | 101 | 250 | 1 |
| $y_{n+3}$ | 50 | 20 | 200 | 200 | 180 |
| $y_{n+4}$ | 50 | 254 | 100 | 100 | 100 |

| | $x_n$ | $x_{n+1}$ | $x_{n+2}$ | $x_{n+3}$ | $x_{n+4}$ |
|---|---|---|---|---|---|
| $y_n$ | 100 | 120 | 120 | 100 | 110 |
| $y_{n+1}$ | 100 | 150 | 200 | 200 | 180 |
| $y_{n+2}$ | 80 | 150 | 255 | 120 | 255 |
| $y_{n+3}$ | 50 | 100 | 200 | 200 | 180 |
| $y_{n+4}$ | 50 | 0 | 100 | 100 | 100 |

|  | $x_n$ | $x_{n+1}$ | $x_{n+2}$ | $x_{n+3}$ | $x_{n+4}$ |
|---|---|---|---|---|---|
| $y_n$ | 0 | 0 | 0 | 0 | 0 |
| $y_{n+1}$ | 0 | 0 | 0 | 0 | 0 |
| $y_{n+2}$ | 0 | 0 | 154 | −130 | 254 |
| $y_{n+3}$ | 0 | 80 | 0 | 0 | 0 |
| $y_{n+4}$ | 0 | −254 | 0 | 0 | 0 |

|  | $x_n$ | $x_{n+1}$ | $x_{n+2}$ | $x_{n+3}$ | $x_{n+4}$ |
|---|---|---|---|---|---|
| $y_n$ | 128 | 128 | 128 | 128 | 128 |
| $y_{n+1}$ | 128 | 128 | 128 | 128 | 128 |
| $y_{n+2}$ | 128 | 128 | 205 | 63 | 255 |
| $y_{n+3}$ | 128 | 168 | 128 | 128 | 128 |
| $y_{n+4}$ | 128 | 1 | 128 | 128 | 128 |

|  | $x_n$ | $x_{n+1}$ | $x_{n+2}$ | $x_{n+3}$ | $x_{n+4}$ |
|---|---|---|---|---|---|
| $y_n$ | 1.0 | 1.0 | 1.0 | 1.0 | 1.0 |
| $y_{n+1}$ | 1.0 | 1.0 | 1.0 | 1.0 | 1.0 |
| $y_{n+2}$ | 1.0 | 1.0 | 2.5 | 0.5 | 128.0 |
| $y_{n+3}$ | 1.0 | 4.8 | 1.0 | 1.0 | 1.0 |
| $y_{n+4}$ | 1.0 | 0.0 | 1.0 | 1.0 | 1.0 |

FIG. 14
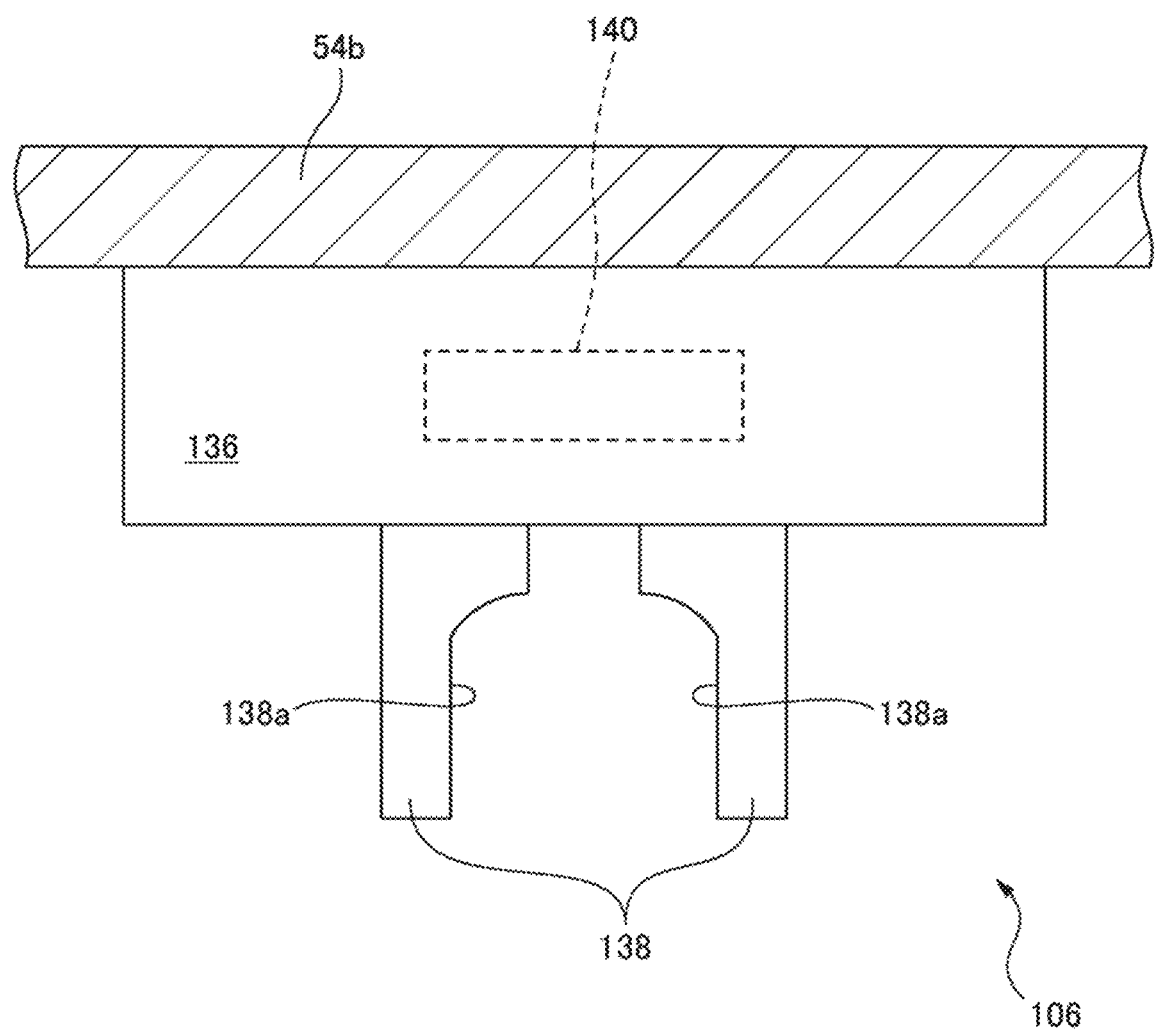
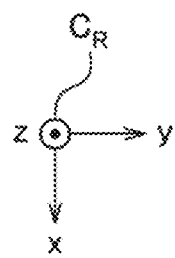

DEVICE, CLEANING SYSTEM, AND METHOD OF DETERMINING WHETHER OR NOT TO CLEAN WORK AREA OF MACHINE TOOL

CROSS-REFERENCE TO RELATED APPLICATIONS

This application is a new U.S. Patent Application that claims benefit of Japanese Patent Application No. 2019-205670, filed Nov. 13, 2019, the disclosure of which is incorporated herein by reference in its entirety for all purposes.

BACKGROUND OF THE INVENTION

1. Field of the Invention

The present invention relates to a device, a cleaning system, and a method of determining whether or not to clean a work area of a machine tool.

2. Description of the Related Art

A system of cleaning a work area of a machine tool has been known (e.g., JP 10-118884 A). There has been a need for a technique for more accurately determining whether or not to clean a work area of a machine tool.

SUMMARY OF THE INVENTION

In an aspect of the present disclosure, a device configured to determine whether or not it is necessary to clean a work area of a machine tool, includes an imaging device configured to image first image data of the work area before the machine tool machines a workpiece in the work area, and to image second image data of the work area after the machine tool machines the workpiece in the work area; an image data generation section configured to generate third image data including pixels each having brightness corresponding to a degree of change between brightness of a pixel of the first image data and brightness of a pixel of the second image data which corresponds to the pixel of the first image data; and a determination section configured to determine whether or not to clean the work area based on a histogram indicating a relationship between the brightness and the number of the pixels of the third image data.

In another aspect of the present disclosure, a cleaning system of a machine tool includes the above-described device, and a cleaning nozzle configured to inject fluid to the work area so as to clean the work area when the determination section determines that it is necessary to clean the work area.

In yet another aspect of the present disclosure, a method of determining whether or not it is necessary to clean a work area of a machine tool, includes imaging first image data of the work area by an imaging device before the machine tool machines a workpiece in the work area; imaging second image data of the work area by the imaging device after the machine tool machines the workpiece in the work area; generating third image data including pixels each having brightness corresponding to a degree of change between brightness of a pixel of the first image data and brightness of a pixel of the second image data which corresponds to the pixel of the first image data; and determining whether or not to clean the work area based on a histogram indicating a relationship between the brightness and the number of the pixels of the third image data.

According to the present disclosure, it is determined whether or not to clean the work area based on the histogram statistically indicating the change in brightness of image data imaged before and after machining. According to this configuration, it is possible to accurately determine whether or not it is necessary to clean the work area by means of a statistical technique.

BRIEF DESCRIPTION OF THE DRAWINGS

FIG. 6 is a diagram schematically illustrating an example of quantifying brightness of each pixel of the first image data.

FIG. 7 is a diagram schematically illustrating an example of quantifying brightness of each pixel of the second image data.

FIG. 8 is a diagram in which brightness of each pixel of third image data according to an example is quantified.

FIG. 9 is a diagram in which brightness of each pixel of third image data according to another example is quantified.

FIG. 10 is a diagram in which brightness of each pixel of third image data according to yet another example is quantified.

FIG. 14 is an enlarged view of an attachment device illustrated in FIG. 13.

DETAILED DESCRIPTION

Figure 1:
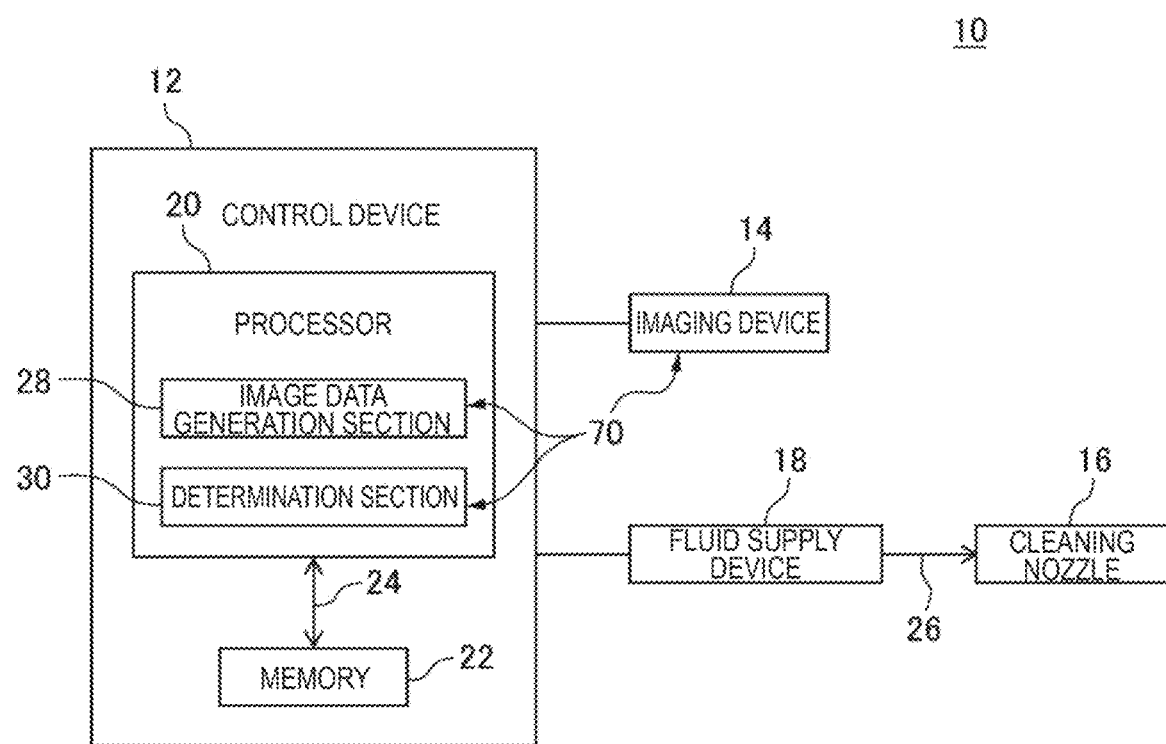
FIG. 1 is a block diagram of a cleaning system according to an embodiment.

Hereinafter, embodiments of the present disclosure will be described in detail with reference to the drawings. In the various embodiments to be described below, similar elements are denoted by the same reference numeral, and redundant description thereof will be omitted. First, a cleaning system 10 according to an embodiment will be described with reference to FIG. 1 and FIG. 2. The cleaning system 10 is configured to clean a work area 62 of a machine tool 50.

Figure 2:
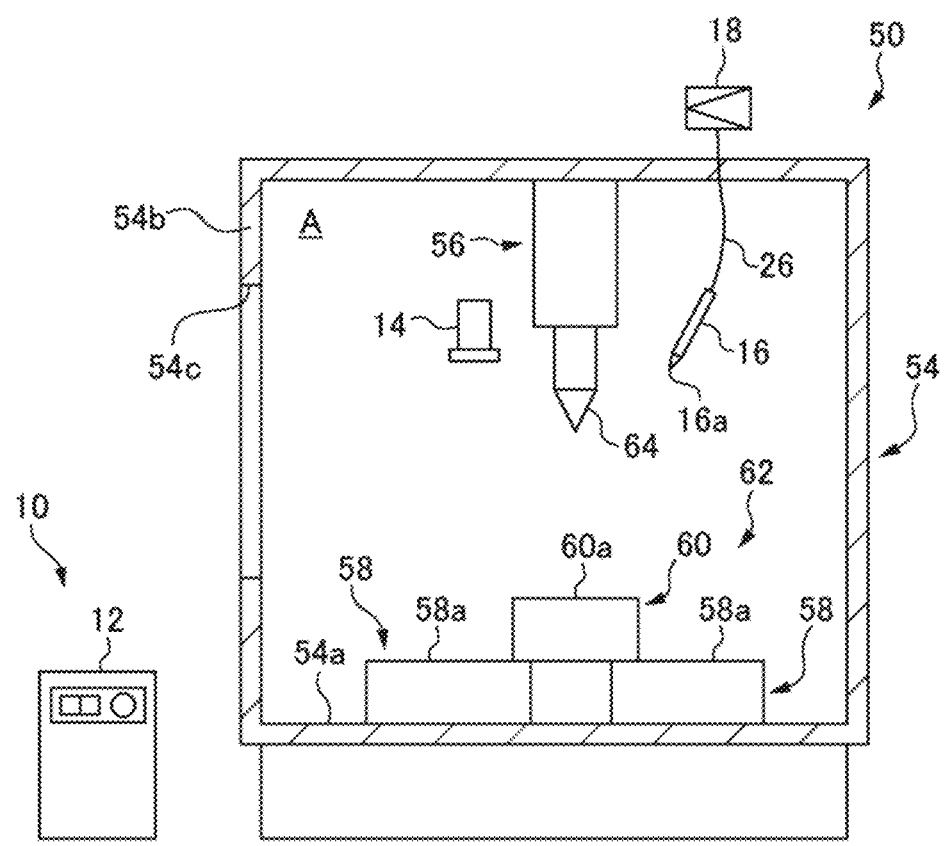
FIG. 2 is a schematic view of the cleaning system illustrated in FIG. 1.

As illustrated in FIG. 2, the machine tool 50 includes a splash guard 54, a machining head 56, a telescopic cover 58, and a machining table 60. The splash guard 54 is a hollow member defining an interior space A, and prevents foreign matter such as cutting fluid or chips generated in the interior space A from leaking to the outside. The splash guard 54 includes a bottom wall 54a and a side wall 54b extending upward from the bottom wall 54a. An opening 54c is formed in the side wall 54b. The opening 54c is opened and closed as necessary by an automatic door (not illustrated).

The machining head 56 is installed in the interior space A, and a tool 64 is attached to a tip of the machining head 56. The machining head 56 rotates the tool 64 to machine a workpiece. The telescopic cover 58 is a telescopic hollow member, and provided on the bottom wall 54a of the splash guard 54. The telescopic cover 58 prevents a component of the machine tool 50 from being exposed to the foreign matter. The machining table 60 is provided so as to be movable in a horizontal direction in the interior space A, and disposed upward of the telescopic cover 58. A jig (not illustrated) is detachably mounted on the machining table 60, and the workpiece is removably set to the jig.

In the present embodiment, the work area 62 of the machine tool 50 is an area to be influenced by an operation for the workpiece (e.g., due to adhesion of the foreign matter) in the interior space A, and defined as an area including the splash guard 54 (bottom wall 54a), the telescopic cover 58, and the machining table 60 (jig), for example.

As illustrated in FIG. 1, the cleaning system 10 includes a control device 12, an imaging device 14, a cleaning nozzle 16, and a fluid supply device 18. The control device 12 controls operations of the imaging device 14 and the fluid supply device 18. Specifically, the control device 12 is a computer including e.g. a processor 20 (CPU, GPU, etc.) and a memory 22 (ROM, RAM, etc.). The processor 20 is communicably connected to the memory 22 via a bus 24, and performs calculations for executing various functions to be described below, while communicating with the memory 22.

Note that the control device 12 may be configured to control a machining operation by the machine tool 50 by controlling operations of the machining head 56 and the machining table. Alternatively, a second control device (not illustrated) different from the control device 12 may be provided to control the machining operation by the machine tool 50. In this case, the control device 12 may be communicably connected to the second control device. The memory 22 temporarily or permanently stores various data.

The imaging device 14 images the work area 62 of the machine tool 50. As an example, the imaging device 14 is a camera including e.g. an image sensor such as a CCD or CMOS, an optical lens such as a focus lens, and an image processing processor. As another example, the imaging device 14 may be a laser scanner type imaging device including e.g. a laser emitting section configured to emit laser beam, a light receiving section configured to receive the laser light reflected by an object, and an image generation section configured to generate image data from the laser light received by the light receiving section.

As yet another example, the imaging device 14 may be a three-dimensional vision sensor capable of imaging an object and measuring a distance to the object. Note that the imaging device 14 may be fixed in the interior space A of the machine tool 50, or may be installed outside the splash guard 54 if a part of the wall of the splash guard 54 of the machine tool 50 is open (or is made of a transparent material). Alternatively, the imaging device 14 may be moved to any position and orientation by a robot to be described below. The imaging device 14 images the work area 62 of the machine tool 50 in accordance with a command from the control device 12, and transmits the captured image data to the control device 12.

The cleaning nozzle 16 is hollow and has an injection port 16a at its tip. The cleaning nozzle 16 injects fluid supplied therein from the injection port 16a in a predetermined injection direction. Note that the cleaning nozzle 16 may be fixed in the interior space A. In this case, the cleaning nozzle 16 is positioned such that the injection direction thereof is directed to the work area 62 (e.g., the machining table 60) to be cleaned. Alternatively, the cleaning nozzle 16 may be moved to any position and orientation by the robot to be described below.

The fluid supply device 18 supplies fluid to the cleaning nozzle 16 in accordance with a command from the control device 12. Specifically, the fluid supply device 18 is fluidically coupled to the cleaning nozzle 16 via a fluid supply tube 26 (e.g., a flexible hose), and supplies the fluid (e.g., compressed gas or compressed liquid) inside the cleaning nozzle 16 through the fluid supply tube 26. The cleaning nozzle 16 cleans the work area 62 by injecting the fluid supplied from the fluid supply tube 26 to the work area 62 (e.g., the machining table 60).

Figure 3:
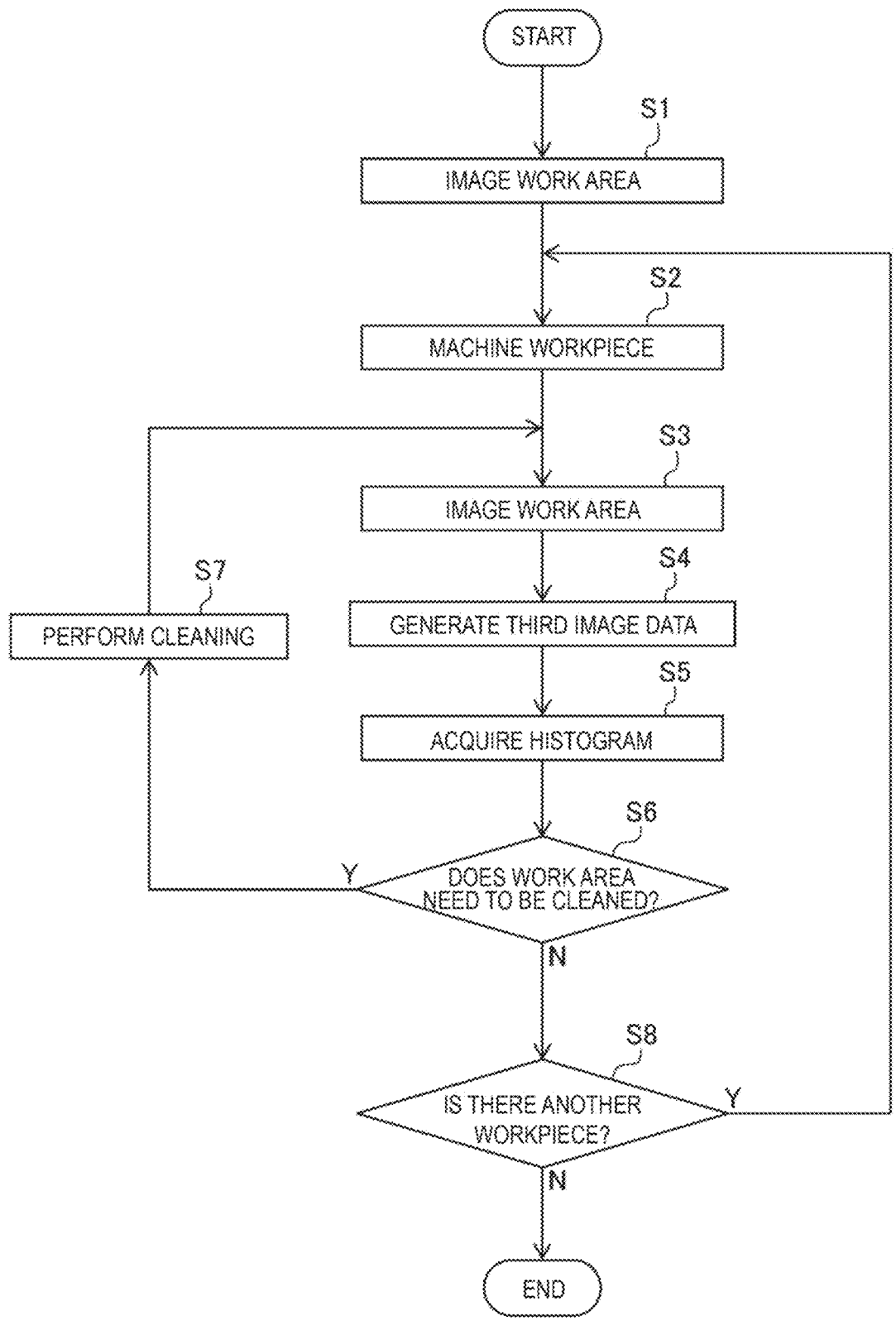
FIG. 3 is a flowchart illustrating an example of an operation process of the cleaning system illustrated in FIG. 1.

Next, an operation of the cleaning system 10 will be described with reference to FIG. 3. A flow illustrated in FIG. 3 is started when the processor 20 receives a work-start command from an operator, a host controller, or a computer program. At the start of the flow illustrated in FIG. 3, assume that a workpiece is not set on the machining table 60, and the work area 62 of the machine tool 50 is substantially free of the foreign matter.

In step S1, the processor 20 images the work area 62 by the imaging device 14. In this embodiment, the processor 20 performs a simulation machining process before imaging the work area 62. Specifically, an operator (or a robot for loading a workpiece) sets the jig on a top surface 60a of the machining table 60, and then sets a dummy workpiece to the jig. The dummy workpiece has the same dimension as a workpiece after machining in step S2 to be described below.

Then, the processor 20 (or the second control device) operates the machining head 56 and the machining table 60 in accordance with a machining program. The machining program includes a command for operating the machining head 56 and the machining table 60, and a command for injecting machining fluid (cutting fluid, coolant, etc.) from a machining fluid injection device (not illustrated), and pre-stored in the memory 22.

By executing the machining program, the processor 20 causes the machining head 56 and the machining table 60 to perform the same operations as the step S2 to be described below, and causes the machining fluid injection device to inject the machining fluid at the same timing and flow rate as step S2 to be described below. When the machining program is ended, the machining head 56 and the machining table 60 return to their initial positions.

Then, the processor 20 causes the imaging device 14 to image the work area 62 at a time $t_2$ at which a predetermined time τ elapses from a time point $t_1$ when the machining fluid has been injected from the machining fluid injection device last time (i.e., $t_2=t_1+\tau$). Here, the time τ may be set such that the time $t_2$ is a time after the processor 20 ends the machining program in the simulation machining process.

For example, the imaging device 14 images the top surface 60a of the machining table 60 in the work area 62. Alternatively, the imaging device 14 may image an inner surface of the bottom wall 54a of the splash guard 54, a top surface 58a of the telescopic cover 58, and the top surface 60a of the machining table 60 in the work area 62.

Figure 4:
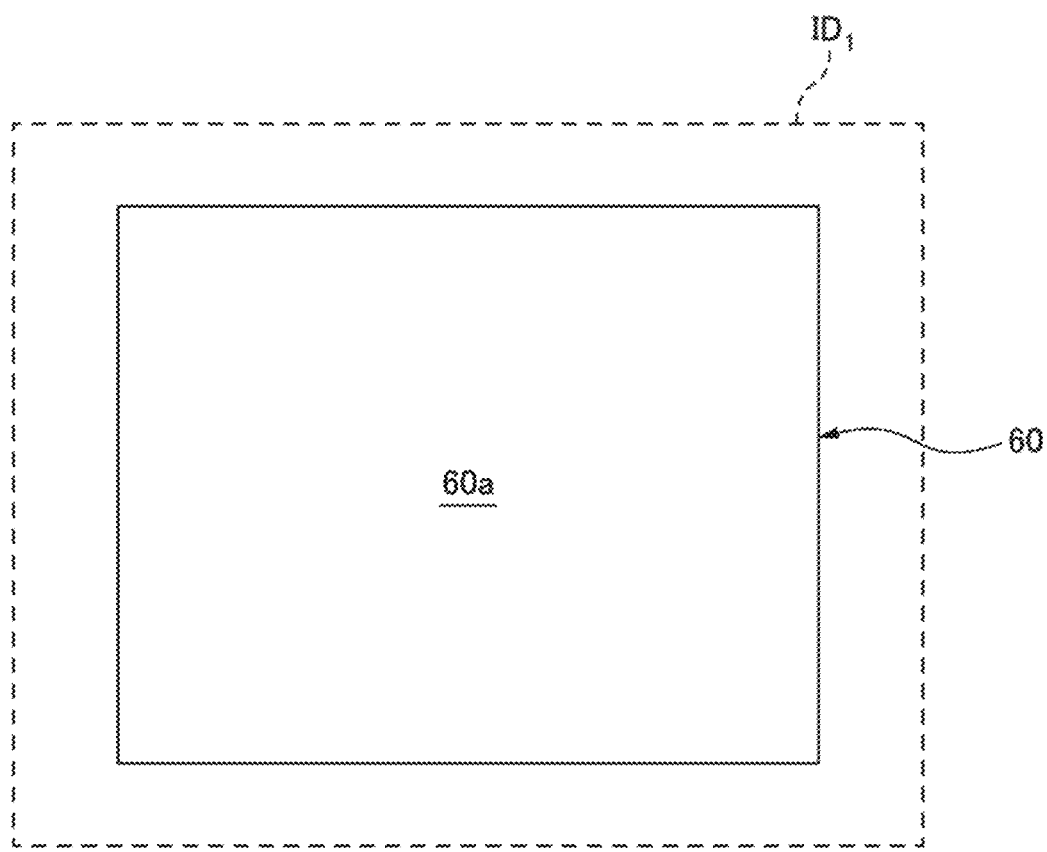
FIG. 4 illustrates an example depicting first image data captured in step S1 in FIG. 3.

The imaging device 14 transmits captured image data $ID_1$ (first image data) to the processor 20, and the processor 20 stores the image data $ID_1$ in the memory 22. This image data $ID_1$ is image data of the work area 62 (e.g., the top surface 60a) imaged by the imaging device 14 before the workpiece is machined in the subsequent step S2. FIG. 4 illustrates an example of the image data $ID_1$ obtained when the imaging device 14 images the top surface 60a of the machining table 60.

In step S2, the machine tool 50 machines the workpiece in the work area 62. Specifically, the operator (or the robot for loading a workpiece) attaches the tool 64 to the machining head 56, sets the jig on the top surface 60a of the machining table 60, and then sets the workpiece to the jig.

Then, the processor 20 (or the second control device) operates the machining head 56 and the machining table 60 in accordance with the above-described machining program so as to machine the workpiece by the tool 64, while injecting the machining fluid from the machining fluid injection device. As a result, foreign matters such as chips are deposited in the work area 62 of the machine tool 50. When the machining program ends in this step S2, the machining head 56 and the machining table 60 return to the same initial position as at the end of the simulation machining process described above.

In step S3, the processor 20 controls the imaging device 14 to image the work area 62. Specifically, the processor 20 executes this step S3 at the time $t_2$ when the predetermined time τ elapses from the time point $t_1$ at which the machining fluid has been injected from the machining fluid injection device last time at step S2, and causes the imaging device 14 to image the work area 62. For example, the imaging device 14 images the top surface 60a of the machining table 60 along the same visual line direction as in step S1. The imaging device 14 transmits captured image data $ID_2$ (second image data) of the work area 62 to the processor 20, and the processor 20 stores the image data $ID_2$ in the memory 22.

Figure 5:
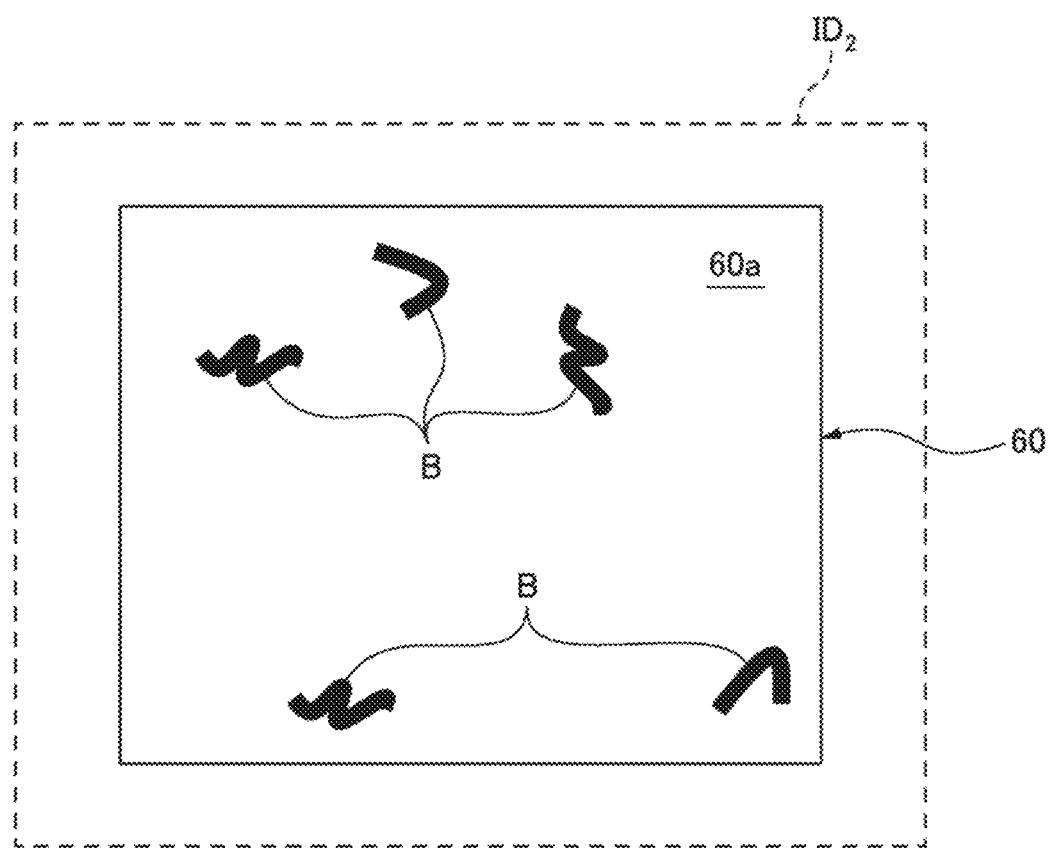
FIG. 5 illustrates an example depicting second image data captured in step S3 in FIG. 3.

This image data $ID_2$ is image data of the work area 62 (e.g., the top surface 60a) imaged by the imaging device 14 after the workpiece is machined in step S2. FIG. 5 illustrates an example of the image data $ID_2$ obtained when the imaging device 14 images the top surface 60a. The image data $ID_2$ imaged after machining contains foreign matters B such as chips on the top surface 60a.

In step S4, the processor 20 generates image data $ID_3$ (third image data) indicating a degree of change in brightness between the image data $ID_1$ imaged in step S1 and the image data $ID_2$ imaged in the most-recent step S3. This image data $ID_3$ is an image having the number of pixels $N_T$ the same as the image data $ID_1$ and the image data $ID_2$. A method of generating the image data $ID_3$ will be described below with reference to FIG. 6 to FIG. 10.

FIG. 6 is a diagram schematically illustrating an example of quantifying brightness of each pixel of the image data $ID_1$ imaged before machining, while FIG. 7 is a diagram schematically illustrating an example of quantifying brightness of each pixel of the image data $ID_2$ imaged after machining. Note that, in FIG. 6 and FIG. 7, five rows and five columns of pixels are illustrated among whole pixels of the image data $ID_1$ and the image data $ID_2$, for the sake of easy understanding.

The processor 20 generates the image data $ID_3$ based on the image data $ID_1$ and the image data $ID_2$. Brightness $BR_3$ of each pixel of the image data $ID_3$ is calculated by the following method as a value corresponding to a degree of change between brightness $BR_1$ of a pixel of the image data $ID_1$ and brightness $BR_2$ of a pixel of the image data $ID_2$ which corresponds to the pixel of the image data $ID_1$.

As an example, the processor 20 calculates the brightness $BR_3$ of each pixel of the image data $ID_3$ from Equation (1) of $BR_3=BR_1-BR_2$. FIG. 8 illustrates a schematic diagram in which the brightness $BR_3$ of each pixel of the image data $ID_3$ is quantified when the brightness $BR_3$ is calculated from Equation (1).

For example, regarding the brightness $BR_3$ of the pixel at the $y_n$-th row and the $x_n$-th column of the image data $ID_3$, since the brightness $BR_1$ of the pixel at the $y_n$-th row and the $x_n$-th column of the image data $ID_1$ is 100 (FIG. 6), and the brightness $BR_2$ of the pixel at the $y_n$-th row and the $x_n$-th column of the image data $ID_2$ is 100 the same as the brightness $BR_1$ (FIG. 7), $BR_3=BR_2-BR_1=0$ is satisfied from Equation (1). That is, if there is no change in brightness between the corresponding pixels of the image data $ID_1$ before machining and the image data $ID_2$ after machining when the Equation (1) is employed, every brightness $BR_3$ of the corresponding pixel of the image data $ID_3$ becomes zero.

On the other hand, regarding the pixel at the $y_{n+2}$-th row and the $x_{n+4}$-th column of the image data $ID_3$, the brightness $BR_1$ of the pixel at the $y_{n+2}$-th row and the $x_{n+4}$-th column of the image data $ID_1$ is 1 (FIG. 6), while the brightness $BR_2$ of the pixel at the $y_{n+2}$-th row and the $x_{n+4}$-th column of the image data $ID_2$ is 255 (FIG. 7) different from the brightness $BR_1$. Such a change between the brightness $BR_1$ and the brightness $BR_2$ may occur due to the foreign matters B illustrated in FIG. 5. In this case, the brightness $BR_3$ of the pixel at the $y_{n+2}$-th row and the $x_{n+4}$-th column of the image data $ID_3$ satisfies $BR_3=BR_2-BR_1=254$ from Equation (1).

As described above, in Equation (1), the brightness $BR_3$ of each pixel of the image data $ID_3$ is calculated as a difference between the brightness $BR_1$ and the brightness $BR_2$, and as illustrated in FIG. 8, the brightness $BR_3$ of the pixel is zero when there is no change in brightness between the pixels of the image data $ID_1$ and the image data $ID_2$, while the brightness $BR_3$ of the pixel is a value other than zero when there is a change in brightness between the pixels of the image data $ID_1$ and the image data $ID_2$. Note that, in FIG. 8, the pixels having the brightness $BR_3$ other than zero are highlighted, for the sake of easy understanding.

As another example, the processor 20 calculates the brightness $BR_3$ of each pixel of the image data $ID_3$ from Equation (2) of $BR_3=(BR_1-BR_2)/2+128$. FIG. 9 illustrates a schematic diagram in which the brightness of each pixel of the image data $ID_3$ is quantified when the brightness $BR_3$ of each pixel of the image data $ID_3$ is calculated from Equation (2).

For example, regarding the pixel at the $y_n$-th row and the $x_n$-th column, the brightness $BR_1$ of the image data $ID_1$ is 100, the brightness $BR_2$ of the image data $ID_2$ is 100, and therefore $BR_3=(BR_1-BR_2)/2+128=128$ is obtained from Equation (2). In other words, if there is no change in brightness between the corresponding pixels of the image data $ID_1$ before machining and the image data $ID_2$ after machining when this Equation (2) is used, every brightness $BR_3$ of the corresponding pixel of the image data $ID_3$ becomes 128.

On the other hand, regarding the pixel at the $y_{n+2}$-th row and the $x_{n+4}$-th column, the brightness $BR_1$ of the image data $ID_1$ is 1, whereas the brightness $BR_2$ of the image data $ID_2$ is 255, and therefore, $BR_3=(BR_1-BR_2)/2+128=255$ is obtained. Thus, in Equation (2), the brightness $BR_3$ of each pixel of the image data $ID_3$ is calculated based on a difference between the brightness $BR_1$ and the brightness $BR_2$, and as illustrated in FIG. 9, the brightness $BR_3$ is 128 if there is no change in brightness between the pixels of the image data $ID_1$ and the image data $ID_2$, while the brightness $BR_3$ is a value other than 128 if there is a change in brightness between the pixels of the image data $ID_1$ and the image data $ID_2$.

As yet another example, the processor 20 calculates the brightness $BR_3$ of each pixel of the image data $ID_3$ from Equation (3) of $BR_3=(BR_2+1)/(BR_1+1)$. FIG. 10 illustrates a schematic diagram in which the brightness of each pixel of the image data $ID_3$ is quantified when the brightness $BR_3$ of each pixel of the image data $ID_3$ is calculated from Equation (3).

For example, regarding the pixel at the $y_n$-th row and the $x_n$-th column, the brightness $BR_1$ of the image data $ID_1$ is 100, the brightness $BR_2$ of the image data $ID_2$ is 100, and therefore, $BR_3=(BR_2+1)/(BR_1+1)=1$ is obtained from Equation (3). In other words, if there is no change in brightness between the corresponding pixels of the image data $ID_1$ before machining and the image data $ID_2$ after machining when this Equation (3) is used, every brightness $BR_3$ of the corresponding pixel of the image data $ID_3$ is 1.

On the other hand, regarding the pixel at the $y_{n+2}$-th row and the $x_{n+4}$-th column, the brightness $BR_1$ of the image data $ID_1$ is 1, whereas the brightness $BR_2$ of the image data $ID_2$ is 255, and therefore $BR_3=(BR_2+1)/(BR_1+1)=128$ is obtained. Thus, in Equation (3), the brightness $BR_3$ of each pixel of the image data $ID_3$ is calculated based on a ratio $((BR_2+1)/(BR_1+1))$ between the brightness $BR_1$ and the brightness $BR_2$, and as illustrated in FIG. 10, the brightness $BR_3$ is 1 if there is no change in brightness between the pixels of the image data $ID_1$ and the image data $ID_2$, whereas the brightness $BR_3$ is a value other than 1 if there is a change in brightness between the pixels of the image data $ID_1$ and the image data $ID_2$.

By means of the above described method, the processor 20 generates the image data $ID_3$ indicating the degree of change between the brightness $BR_1$ of the image data $ID_1$ and the brightness $BR_2$ of the image data $ID_2$. Accordingly, the processor 20 functions as an image data generation section 28 (FIG. 1). The processor 20 stores the generated image data $ID_3$ in the memory 22.

Note that, in FIG. 8 to FIG. 10, for the sake of easy understanding, the image data $ID_3$ is shown as grid data of y columns×x rows. However, the image data $ID_3$ generated by the processor 20 is not necessarily be such grid data, but it may be data in which the pixels and the corresponding brightness $BR_3$ are stored in the form of a list, for example.

Figure 11:
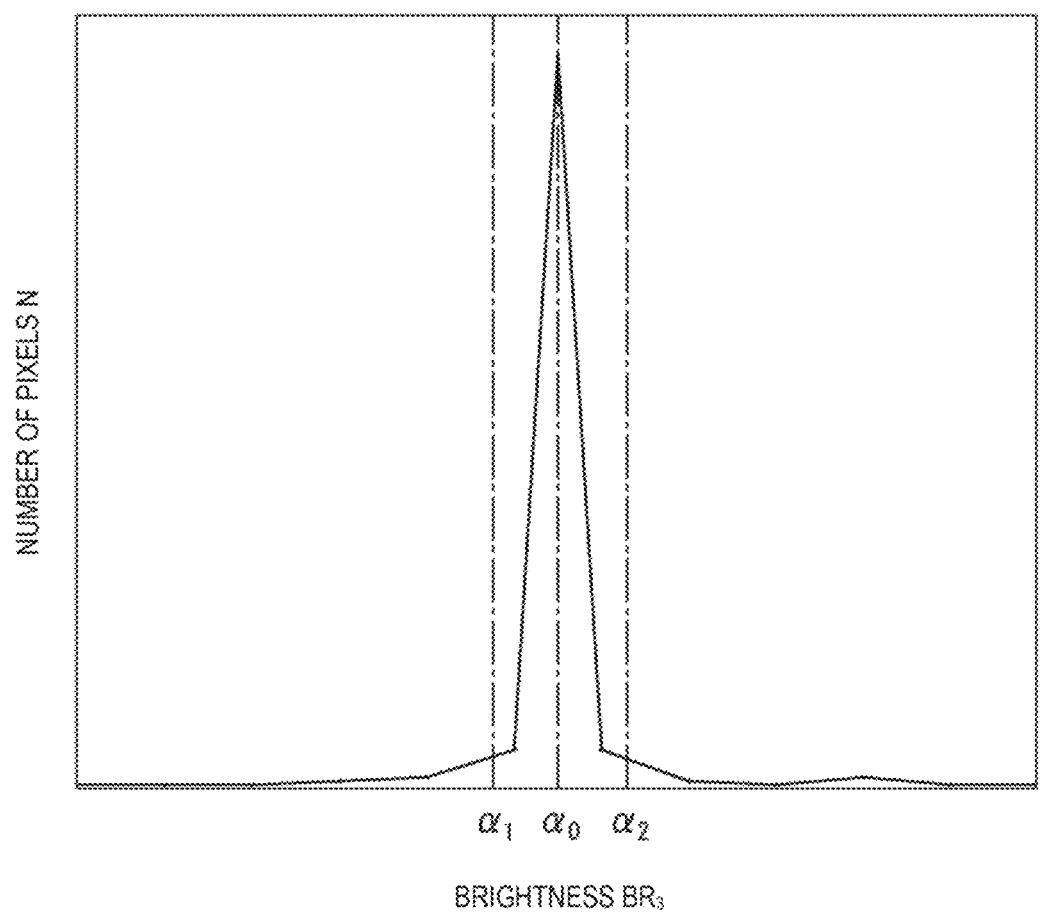
FIG. 11 illustrates an example depicting a histogram of the third image data.

Again, with reference to FIG. 3, in step S5, the processor 20 acquires a histogram HG of the image data $ID_3$ generated in step S4. The histogram HG is data indicating a relationship between the brightness $BR_3$ of each pixel of the image data $ID_3$ and the number of pixels N. An example of a diagram depicting the histogram HG is illustrated in FIG. 11. Note that the processor 20 may acquire the histogram HG in the form of only numerical data, or may generate an image of the histogram HG as illustrated in FIG. 11 and display the image on a display (not illustrated) provided on the control device 12.

In general, brightness of each pixel in image data is displayed by a total of 256 stages of 0 to 255. When an image of the histogram HG obtained by above Equation (2) is generated, the brightness $BR_3$ can be represented by the 256 stages, and a position of the brightness $BR_3=128$ can be a median of brightness. Thus, according to Equation (2), the image of the histogram HG can be displayed by an existing image processing program.

Further, if Equation (3) described above is used and the brightness of the pixels is displayed by the total of 256 stages of 0 to 255, it is possible to prevent the brightness $BR_1$ from being infinity even when $BR_1=0$ is satisfied. Note that, if the brightness of the pixels is displayed by the total of 256 stages of 1 to 256, Equation (3) may be defined as an equation of $BR_3=BR_2/BR_1$.

Regarding the histogram HG, if there is no change in brightness between the corresponding pixels of the image data $ID_1$ before machining and the image data $ID_2$ after machining (i.e., if there is no foreign matter B illustrated in FIG. 5), the number of pixels N where the brightness $BR_3$ is a reference value $\alpha_0$ is substantially the same as a total number of pixels $N_T$ of the image data $ID_3$ (i.e., the histogram HG becomes a characteristics in which an impulse of $N \approx N_T$ exists at $BR_3=\alpha_0$), in the histogram HG. The reference value $\alpha_0$ is zero when Equation (1) is used, the reference value $\alpha_0$ is 128 when Equation (2) is used, and the reference value $\alpha_0$ is 1 when Equation (3) is used.

On the other hand, if there is a change in brightness between the corresponding pixels of the image data $ID_1$ before machining and the image data $ID_2$ after machining (i.e., if the foreign matters B illustrated in FIG. 5 exist), the number of pixels N exists in a range of the brightness $BR_3$ other than the reference value $\alpha_0$, in the histogram HG. Thus, the histogram HG is data statistically indicating the change in brightness between the image data $ID_1$ before machining and the image data $ID_2$ after machining.

In step S6, the processor 20 determines whether or not to clean the work area 62 based on the histogram HG. As an example, the processor 20 determines that it is necessary to clean the work area 62 when a rate $R_1$ of the number of pixels $N_X$ having the brightness $BR_3$ being within a predetermined range $[\alpha_1, \alpha_2]$ with respect to the total number of pixels $N_T$ (i.e., $R_1=N_X/N_T$) in the histogram HG is equal to or smaller than a predetermined threshold value $R_{th1}$ (i.e., $R_1=N_X/N_T R_{th1}$).

Specifically, as described above, if there is a change in brightness between the image data $ID_1$ before machining and the image data $ID_2$ after machining, instead of a decrease in the number of pixels N at the reference value $\alpha_0$, the number of pixels N is widely distributed in the range of the brightness $BR_3$ other than the reference value $\alpha_0$.

Accordingly, if the threshold values $\alpha_1$ and $\alpha_2$ of the range $[\alpha_1, \alpha_2]$ are set to include the reference value $\alpha_0$ as illustrated in FIG. 11, the larger the change in brightness between the image data $ID_1$ and the image data $ID_2$ (i.e., the more the number of foreign matters B in FIG. 5 is), the less the number of pixels $N_X$ within the range $\alpha_1 \leq BR_3 \leq \alpha_2$ is. Therefore, the rate $R_1$ of the number of pixels $N_X$ with respect to the total number of pixels $N_T$ ($R_1=N_X/N_T$) is data that quantitatively represents a magnitude of the change in brightness between the image data $ID_1$ and the image data $ID_2$ (i.e., largeness of the number of the foreign matters B included in the image data $ID_2$ after machining).

The processor 20 calculates the rate $R_1$ from the data of the histogram HG, and determines that it is necessary to clean the work area 62 (i.e., determines YES) when the rate $R_1$ is equal to or less than the threshold value $R_{th1}$, and then proceeds to step S7. On the other hand, the processor 20 determines NO when the rate $R_1$ is larger than the threshold value $R_{th1}$, and proceeds to step S8.

As another example, the processor 20 determines that it is necessary to clean the work area 62 when a rate $R_2$ of the number of pixels $N_Y$ having the brightness $BR_3$ being out of the range $[\alpha_1, \alpha_2]$ with respect to the total number of pixels $N_T$ (i.e., $R_2=N_Y/N_T$) in the histogram HG is equal to or larger than a predetermined threshold value $R_{th2}$ (i.e., $R_2=N_Y/N_T \geq R_{th2}$).

In this regard, as the change in brightness between the image data $ID_1$ and the image data $ID_2$ is larger (i.e., as the number of the foreign matters B in FIG. 5 increases), the number of pixels $N_X$ within the range of $\alpha_1 \leq BR_3 \leq \alpha_2$ decreases, while the number of pixels $N_Y$ in the range of $BR_3 < \alpha_1$ or $\alpha_2 < BR_3$ increases. Therefore, the rate $R_2$ of the number of pixels $N_Y$ with respect to the total number of pixels $N_T$ ($R_2=N_Y/N_T$) is data that quantitatively represents the number of foreign matters B included in the image data $ID_2$ after machining. The processor 20 calculates the rate $R_2$ from the data of the histogram HG, and determines that it is necessary to clean the work area 62 (YES) when the rate $R_2$ is equal to or larger than the threshold value $R_{th2}$.

As yet another example, the processor 20 extracts a locus of a graph line of the histogram HG (see FIG. 11) acquired in step S5, and calculates a matching degree between a shape of the locus of the graph line in the histogram HG and a locus of a graph line of a reference histogram $HG_R$. The reference histogram $HG_R$ is a histogram in a case where there is no change in brightness between the image data $ID_1$ and the image data $ID_2$.

The reference histogram $HG_R$ may be obtained in the following manner, for example. Specifically, the processor 20 images the image data $ID_1$ twice before machining (step S1). Then, the processor 20 generates reference image data $ID_R$ indicating a degree of change in brightness between two pieces of image data $ID_1$ imaged before machining, by the method described in above step S4. Then, the processor 20 acquires the reference histogram $HG_R$ from the reference image data $ID_R$.

Alternatively, the reference histogram $HG_R$ may be manually created by the operator. The processor 20 determines YES in this step S6 when the matching degree between the shape of the locus of the graph line of the histogram HG and the shape of the locus of the graph line of the reference histogram $HG_R$ is less than a predetermined threshold value.

As yet another example, the processor 20 calculates a standard deviation of the histogram HG acquired in step S5. The processor 20 determines YES in this step S6 when the standard deviation of the histogram HG is larger than a predetermined threshold value. By the method described above, the processor 20 determines whether or not to clean the work area 62 (e.g., the top surface 60a) based on the histogram HG. Accordingly, the processor 20 functions as the determination section 30 (FIG. 1) configured to determine whether or not to clean the work area 62.

In step S7, the processor 20 performs cleaning of the work area 62. Specifically, the processor 20 operates the fluid supply device 18 to supply fluid to the cleaning nozzle 16. The cleaning nozzle 16 injects the fluid supplied from the fluid supply tube 26 to the work area 62 (the top surface 60a of the machining table 60) to clean the work area 62. After step S7, the processor 20 returns to step S3 and repeatedly executes a loop of steps S3 to S7 until it determines NO in step S6.

Note that the processor 20 may count the number of times "m" for that it executes step S7 (or it determines YES in step S6), output an alarm signal in the form of sound or image indicating that "The number of times of cleaning reached predetermined number" when the number of times "m" reaches a predetermined number m (e.g., $m_{MAX}=3$), and proceed to step S8 (or may end the flow in FIG. 3). Due to this, it is possible to prevent the number of times of execution of step S7 from being too large.

In step S8, the processor 20 analyzes the computer program and determines whether or not there is another workpiece to be machined. The processor 20 returns to step S2 when it determines that there is another workpiece to be machined (i.e., determines YES), while the processor 20 ends the flow illustrated in FIG. 3 when it determines that there is no workpiece to be machined (i.e., determines NO).

As described above, in the present embodiment, the imaging device 14 images the image data $ID_1$ and the image data $ID_2$ before and after machining, the image data generation section 28 generates the image data $ID_3$, and the determination section 30 determines whether or not to clean the work area 62 based on the histogram HG. Accordingly, the imaging device 14, the image data generation section 28, and the determination section 30 constitute a device 70 (FIG. 1) configured to determine whether or not it is necessary to clean the work area 62 of the machine tool 50.

In the present embodiment, the processor 20 determines whether or not to clean the work area 62 based on the histogram HG that statistically indicates the change in brightness between the image data $ID_1$ and the image data $ID_2$ captured before and after machining. According to this configuration, it is possible to determine whether or not it is necessary to clean the work area 62 with high accuracy, by means of a statistical technique.

Also, in the present embodiment, the processor 20 determines that it is necessary to clean the work area 62 if the rate $R_1$ is less than or equal to the threshold value $R_{th1}$ or the rate $R_2$ is equal to or larger than the threshold value $R_{th2}$, in the histogram HG. According to this configuration, it is possible to automatically determine whether or not to clean the work area 62 by a relatively simple algorithm.

Further, in the present embodiment, the processor 20 causes the imaging device 14 to image the image data $ID_1$ after performing the simulation machining process in step S1. According to this configuration, the arrangement of elements in the work area 62, such as the machining table 60, and a state of the machining fluid, which are shown in the image data $ID_1$ and $ID_2$, can be the same between the image data $ID_1$ captured in step S1 and the image data $ID_2$ captured in step S3 after machining. Accordingly, it is possible to prevent the brightness $BR_3$ of each pixel of the image data $ID_3$ from including a value due to the arrangement of elements in the work area 62 and the machining fluid.

Figure 12:
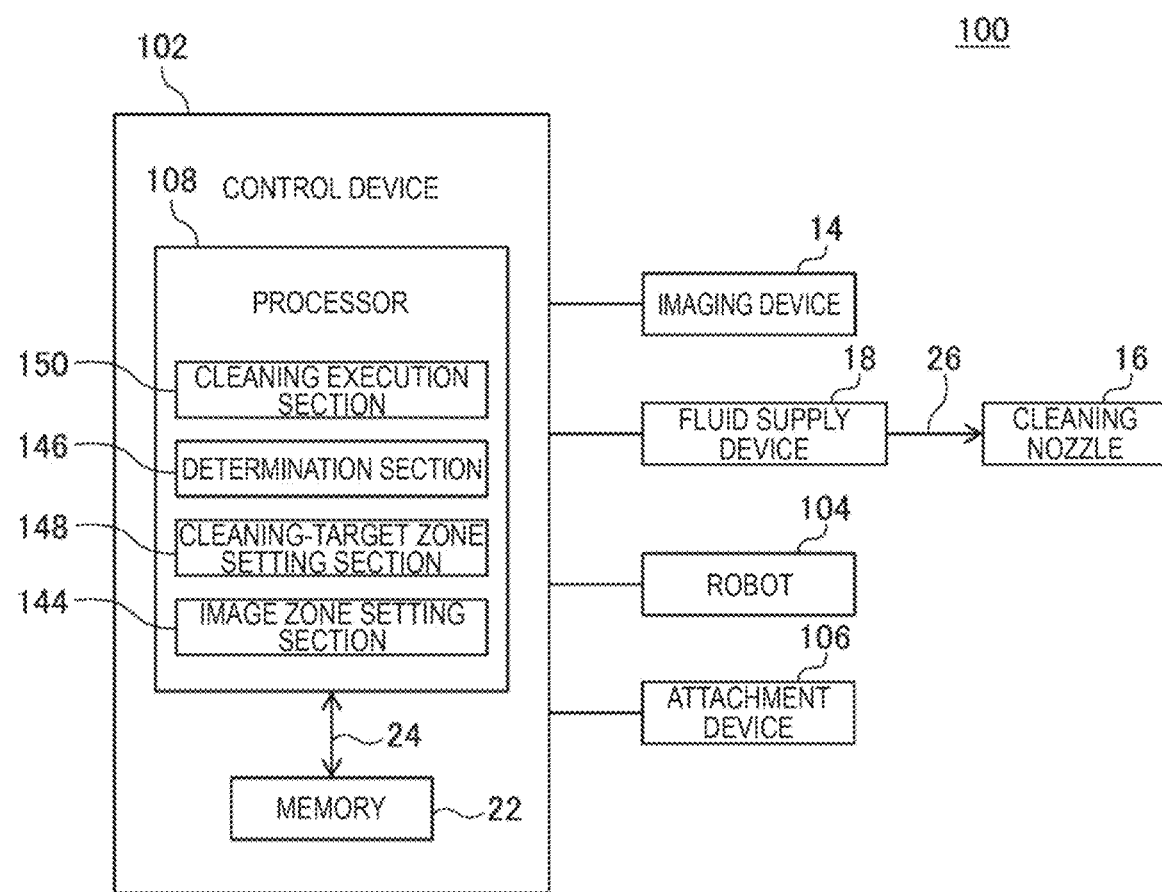
FIG. 12 is a block diagram of a cleaning system according to another embodiment.

Next, a cleaning system 100 according to another embodiment will be described with reference to FIG. 12 and FIG. 13. The cleaning system 100 is for cleaning the work area 62 of the machine tool 50, and includes the imaging device 14, the cleaning nozzle 16, the fluid supply device 18, a control device 102, a robot 104, and an attachment device claws.

The control device 102 controls operations of the imaging device 14, the fluid supply device 18, the robot 104, and the attachment device claws. Specifically, the control device 102 is a computer including e.g., a processor 108 (CPU, GPU, etc.) and the memory 22 (ROM, RAM, etc.). The processor 108 is communicably connected to the memory 22 via the bus 24, and performs calculations for carrying out various functions to be described below, while communicating with the memory 22.

Figure 13:
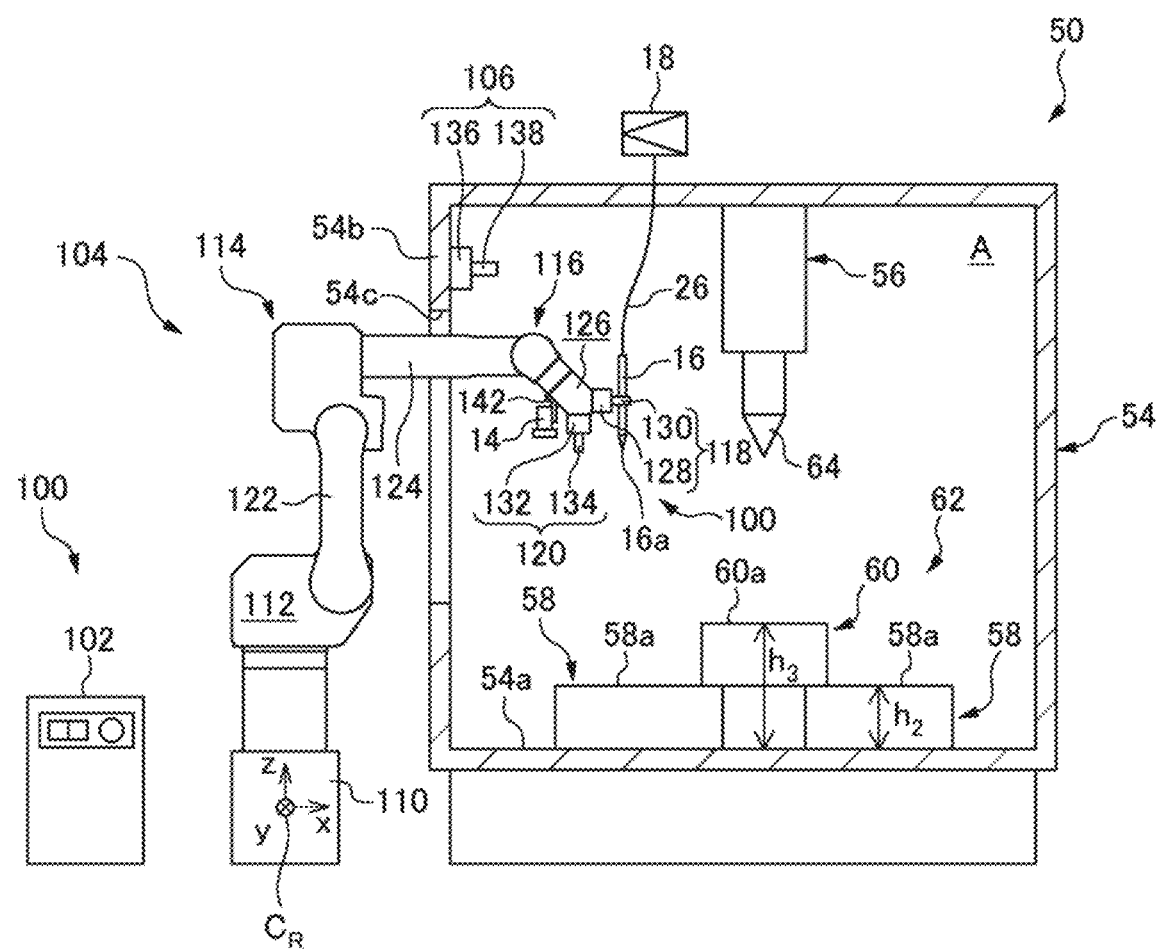
FIG. 13 is a schematic view of the cleaning system illustrated in FIG. 12.

As illustrated in FIG. 13, in the present embodiment, the robot 104 is a vertical articulated robot, and includes a robot base 110, a turning body 112, a robot arm 114, a wrist 116, and robot hands 118 and 120. The robot base 110 is fixed on a floor of a work cell. The turning body 112 is provided at the robot base 110 so as to be rotatable about a vertical axis.

The robot arm 114 includes a lower arm 122 rotatably attached to the turning body 112, and an upper arm 124 rotatably attached to a distal end of the lower arm 122. The wrist 116 is provided at a distal end of the upper arm 124, and rotatably supports the robot hands 118 and 120.

Servo motors (not illustrated) are provided in the robot base 110, the turning body 112, the robot arm 114, and the wrist 116, respectively. These servo motors drive the turning body 112, the robot arm 114, and the wrist 116 about their drive shafts under commands from the control device 102, thereby operating the robot 104.

The robot hand 118 includes a hand base 128 fixed to an adapter 126 provided at a distal end of the wrist 116, and a plurality of fingers 130 provided at the hand base 128 so as to open and close. A finger driver (not illustrated) having an air cylinder or a motor is incorporated in the hand base 128, and causes the fingers 130 to open and close under a command from the control device 102. As a result, the robot hand 118 grips or releases the cleaning nozzle 16 with its fingers 130. Note that the fingers 130 of the robot hand 118 may be configured to be able to grip a workpiece to be gripped by the robot hand 120, in addition to the cleaning nozzle 16.

On the other hand, the robot hand 120 includes a hand base 132 fixed to the adapter 126, and a plurality of fingers 134 provided at the hand base 132 so as to open and close. A second finger driver (not illustrated) having an air cylinder or a motor is incorporated in the hand base 132, and causes the fingers 134 to open and close under a command from the control device 102. As a result, the robot hand 120 grips or releases an object such as a workpiece with its fingers 134.

The attachment device 106 is disposed at a predetermined position in the interior space A of the machine tool 50, and mounted on the side wall 54b of the splash guard 54. Specifically, as illustrated in FIG. 14, the attachment device 106 includes a base 136 fixed to the side wall 54b, a plurality of claws 138 provided at the base 136 so as to open and close, and a claw drive section 140 configured to open and close the claws 138.

Figure 15:
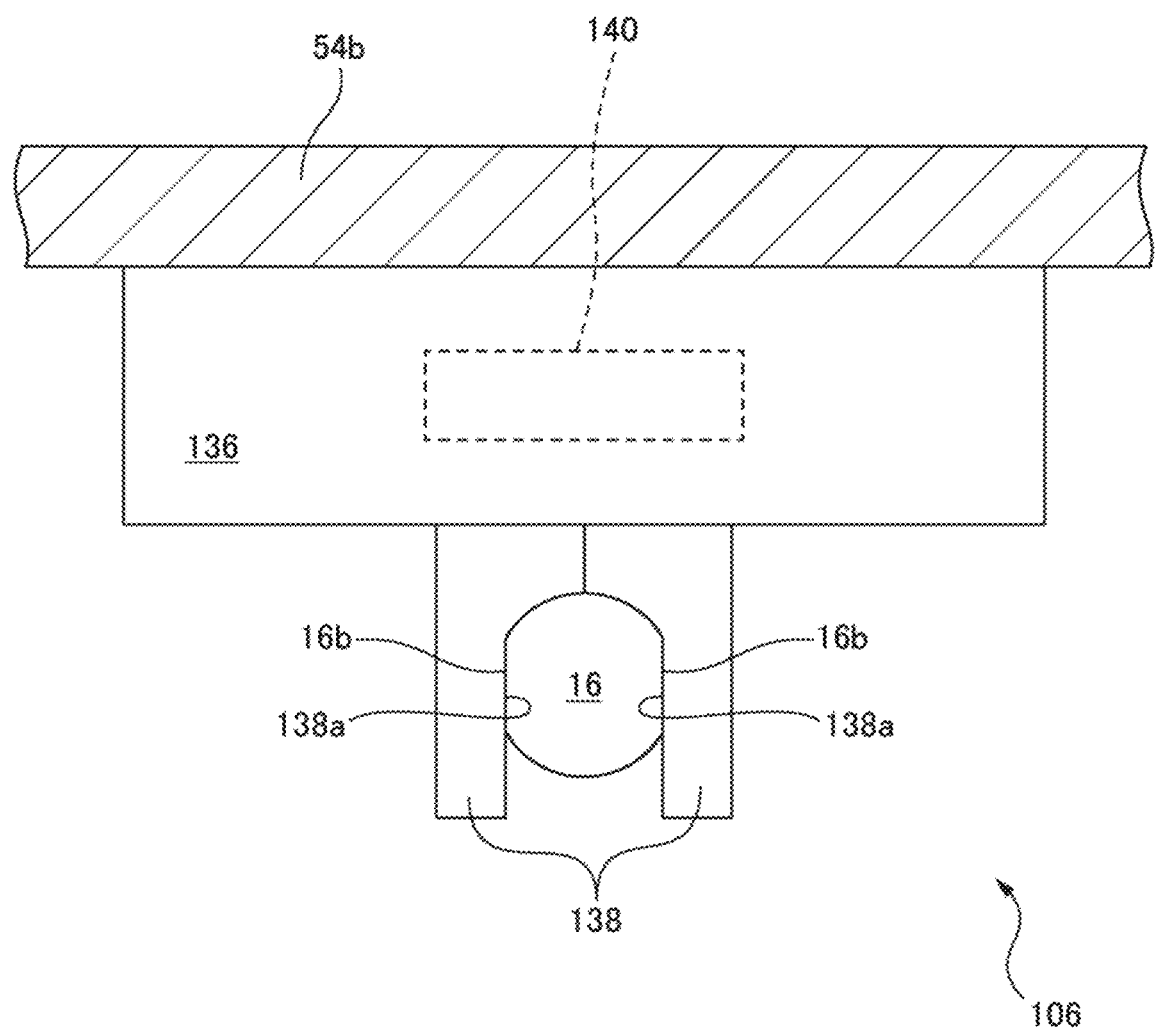
FIG. 15 illustrates a state in which the attachment device illustrated in FIG. 13 grips a cleaning nozzle.

The claw drive section 140 has an air cylinder or a motor, and automatically opens and closes the claws 138 under a command from the control device 102. The attachment device 106 can hold the cleaning nozzle 16 between the claws 138 by closing the claws 138, as illustrated in FIG. 15. Further, the attachment device 106 can releases the held cleaning nozzle 16 by opening the claws 138 as illustrated in FIG. 14.

Note that, in the present embodiment, a flat surface portion 138a is formed on an inner surface of each claw 138, whereas a flat surface portion 16b that surface-contacts the flat surface portion 138a is formed on each of both side surfaces of the cleaning nozzle 16. Due to the surface-contact between the flat surface portion 138a and the flat surface portion 16b, the claws 138 can stably grip the cleaning nozzle 16. Note that a high friction portion (a concave-convex portion, a rubber layer, a high-friction resin layer, etc.) that increases a friction coefficient between the claws 138 and the cleaning nozzle 16 may be provided on the flat surface portion 138a of each claws 138.

Additionally, the cleaning system 100 may further include a blower (not illustrated) that blows off foreign matter adhered to the inner surfaces of the claws 138 by injecting fluid (e.g., compressed gas) on the inner surfaces. In this case, the blower may be incorporated in the attachment device 106 (e.g., the base 136), and a fluid injection port of the blower may be provided on the inner surfaces (e.g., the flat surface portions 138a) of the claws 138. Due to this, it is possible to prevent foreign matter from being adhered to the inner surfaces of the claws 138, and thus the attachment device 106 can reliably hold the cleaning nozzle 16 at the same position and orientation.

As illustrated in FIG. 13, the imaging device 14 is fixed to the adapter 126 via a bracket 142, and moved to any position and orientation by the robot 104. In the present embodiment, the imaging device 14 is a three-dimensional vision sensor configured to image an object and measure a distance to the object.

A robot coordinate system $C_R$ is set for the robot 104. The robot coordinate system $C_R$ is a coordinate system that serves as a reference for automatic control of each of the movable components (the turning body 112, the robot arm 114, and the wrist 116) of the robot 104. In the present embodiment, the robot coordinate system $C_R$ is set such that its origin is positioned at a center of the robot base 110, and its z-axis coincides with a rotation axis of the turning body 112. The processor 108 generates a command to each servo motor of the robot 104 with reference to the robot coordinate system $C_R$, and operates each movable component of the robot 104 so as to arrange the imaging device 14 and the robot hands 118 and 120 at any position and orientation in the robot coordinate system $C_R$.

The robot base 110 and the turning body 112 of the robot 104 are installed outside the splash guard 54 of the machine tool 50. The processor 108 operates the robot 104 so as to advance and retract the imaging device 14 and the robot hands 118 and 120 to and from the interior space A of the machine tool 50 through the opening 54c provided in the side wall 54b of the splash guard 54.

Figure 16:
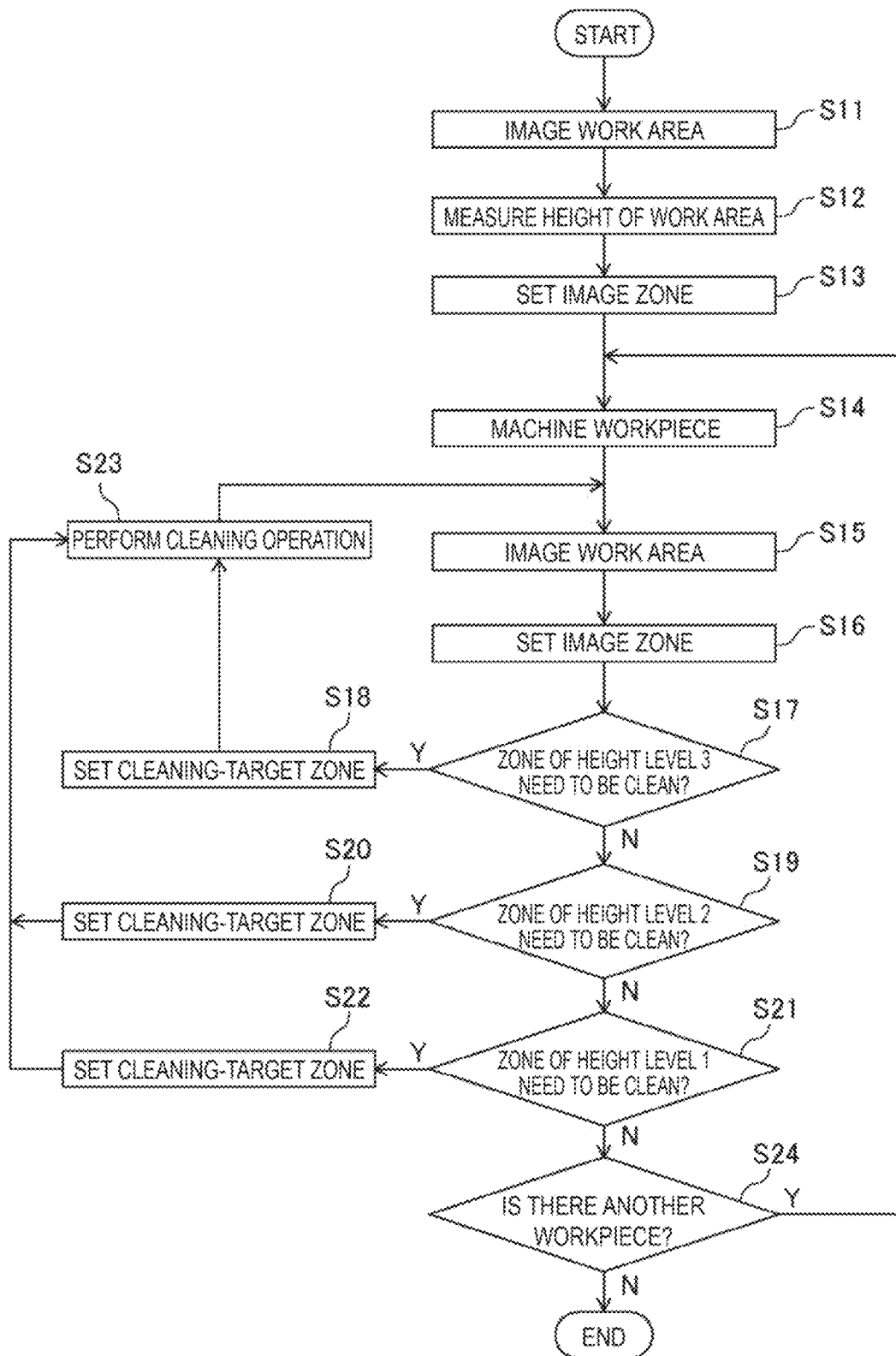
FIG. 16 is a flowchart illustrating an example of an operation process of the cleaning system illustrated in FIG. 12.

Next, an operation of the cleaning system 100 will be described with reference to FIG. 16. A flow illustrated in FIG. 16 is started when the processor 108 receives a work-start command from an operator, a host controller, or a computer program. At the start of the flow illustrated in FIG. 16, a workpiece is not set on the machining table 60, and the work area 62 of the machine tool 50 is substantially free of foreign matter. In addition, at the start of the flow illustrated in FIG. 16, the cleaning nozzle 16 is attached to the attachment device 106 (FIG. 15).

In step S11, the processor 108 images the work area 62 by the imaging device 14. In this embodiment, the processor 108 performs the simulation machining process before imaging the work area 62. Specifically, the operator (or the robot 104) sets the jig on the top surface 60a of the machining table 60. Next, the processor 108 operates the robot 104 to grip a dummy workpiece placed at a predetermined storage place outside the machine tool 50 with the robot hand 120, transports the dummy workpiece to the interior space A of the machine tool 50 through the opening 54c of the splash guard 54, and then sets the dummy workpiece on the jig. The dummy workpiece has a dimension the same as a workpiece, which is to be machined in step S14 described below and which has been already machined.

Then, the processor 108 operates the machining head 56 and the machining table 60 in accordance with the machining program. By executing the machining program, the processor 108 causes the machining head 56 and the machining table 60 to perform the same operation as in the step S14 described below, while injecting the machining fluid from the machining fluid injection device at the same timing and flow rate as in the step S14 described below. When the machining program is ended, the machining head 56 and the machining table 60 return to their initial positions.

Then, the processor 108 starts the imaging operation by the imaging device 14 at the time $t_2$ at which the predetermined time τ elapses from the time $t_1$ when the machining fluid has been injected from the machining fluid injection device last time. Specifically, the processor 108 operates the robot 104 to dispose the imaging device 14 at a predetermined imaging position. For example, when the imaging device 14 is disposed at the imaging position, the imaging device 14 is disposed upward (i.e., in the z-axis positive direction of the robot coordinate system $C_R$) of the work area 62, the visual line direction of the imaging device 14 is parallel to the z-axis in the robot coordinate system $C_R$ (i.e., in the vertical direction), and the bottom wall 54a of the splash guard 54, the top surface 58a of the telescopic cover 58, and the top surface 60a of the machining table 60 of the work area 62 fall within the field of view of the imaging device 14.

Figure 17:
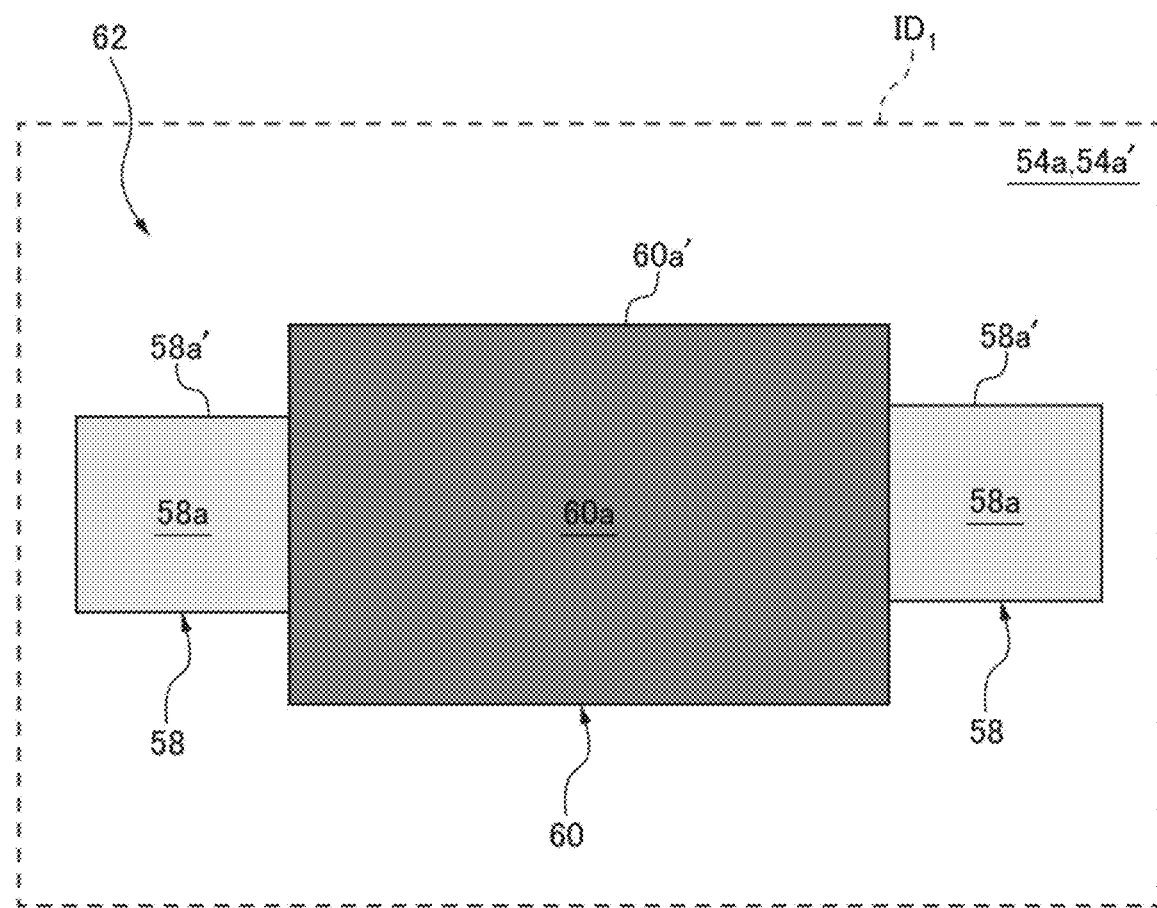
FIG. 17 illustrates an example depicting first image data captured in step S11 in FIG. 16.

Position data of the imaging position in the robot coordinate system $C_R$ is pre-stored in the memory 22. When the imaging device 14 is disposed at the imaging position, the processor 108 operates the imaging device 14 to image the work area 62. The imaging device 14 transmits the captured image data $ID_1$ (the first image data) to the processor 108, and the processor 108 stores the image data $ID_1$ in the memory 22. This image data $ID_1$ is image data of the work area 62 imaged by the imaging device 14 before machining the workpiece in the subsequent step S14. FIG. 17 illustrates an example of the image data $ID_1$ obtained by the imaging device 14 imaging the work area 62 in this step S11.

In step S12, the processor 108 operates the imaging device 14 to measure a height h of the work area 62. As described above, the work area 62 includes the bottom wall 54a, the telescopic cover 58, and the machining table 60. As illustrated in FIG. 13, the top surface 58a of the telescopic cover 58 is positioned at a height $h_2$ upward from the inner surface of the bottom wall 54a, and the top surface 60a of the machining table 60 is positioned at a height $h_3$ ($>h_2$) upward from the bottom wall 54a. Thus, the work area 62 includes a zone 54a (the inner surface of the bottom wall 54a), a zone 58a (the top surface 58a), and a zone 60a (the top surface 60a), whose heights h are different from each other.

The imaging device 14 images the image data $ID_1$ in step S11, and measures the height h of each zone (54a, 58a, 60a) of the work area 62 included in the image data $ID_1$. For example, the imaging device 14 includes a laser emitting section configured to emit laser beam, and a light receiving section configured to receive the laser light reflected by an object in the work area 62.

The imaging device 14 measures a distance from the imaging device 14 to the object in the work area 62 by a triangulation method. Alternatively, the imaging device 14 may have two cameras and measure the distance to the object in the work area 62 from two images captured by the two cameras. By such a technique, the imaging device 14 can measure a distance $d_3$ to the zone 60a, a distance $d_2$ to the zone 58a, and a distance $d_1$ to the zone 54a, which are present in the work area 62.

These distances $d_1$, $d_2$, and $d_3$ are information indicating the heights h of the zones 54a, 58a, and 60a. Specifically, if the zone 54a is used as a reference of the height h, the height $h_2$ of the zone 58a can be obtained by subtracting the distance $d_2$ from the distance $d_1$, and the height $h_3$ of the zone 60a can be obtained by subtracting the distance $d_3$ from the distance $d_1$.

The imaging device 14 may measure the distances $d_1$, $d_2$, and $d_3$ as information of the heights h of the zones 54a, 58a, and 60a, or may measure the heights $h_2$ and $h_3$. The processor 108 acquires the information of the heights h measured by the imaging device 14 from the imaging device 14, and stores the information in the memory 22.

In step S13, the processor 108 sets a plurality of image zones in response to the heights h of the work area 62, in the image data $ID_1$ imaged by the imaging device 14 in step S11. Specifically, the processor 108 extracts from the image data $ID_1$ each zone in the work area 62 for each height h, based on the information of the heights h acquired in step S12.

For example, when the distances $d_1$, $d_2$, and $d_3$ are acquired as the information of the heights h in step S12, the processor 108 extracts from the image data $ID_1$ the zone where the distance d is within a predetermined range of $d_{th1} \le d < d_{th2}$. For example, assume that the distance $d_3$ of the zone 60a satisfies $d_{th1} \le d_3 < d_{th2}$. In this case, the processor 108 extracts an image zone that shows the zone 60a from the image data $ID_1$, and sets this image zone as an image zone 60a' of "height level 3".

Additionally, the processor 108 extracts a zone where the distance d is within a predetermined range of $d_{th2} \le d < d_{th3}$ from the image data $ID_1$. For example, assume that the distance $d_2$ of the zone 58a satisfies $d_{th2} \le d_2 < d_{th3}$. In this case, the processor 108 extracts an image zone that shows the zone 58a from the image data $ID_1$, and sets this image zone as an image zone 58a' of "height level 2".

In addition, the processor 108 extracts the zone where the distance d is within a predetermined range of $d_{th3} \le d$ from the image data $ID_1$. For example, assume that the distance $d_3$ of the zone 54a satisfies $d_{th3} \le d_3$. In this case, the processor 108 extracts an image zone that shows the zone 54a from the image data $ID_1$, and sets this image zone as an image zone 54a' of "height level 1".

In FIG. 17, for the sake of easy understanding, the image zone 54a' (zone 54a) is indicated by white color, the image zone 58a' (zone 58a) is indicated by light gray color, and the image zone 60a' (zone 60a) is indicated by dark gray color. The threshold values $d_{th1}$, $d_{th2}$ and $d_{th3}$, which define a range of the distance d described above, are predetermined by an operator depending on the imaging position of the imaging device 14, and stored in the memory 22.

In this way, the processor 108 sets the plurality of image zones 54a', 58a' and 60a' in the image data $ID_1$ in response to the height h of the work area 62, based on the information of the height h acquired in step S12 (i.e., the distances d). Accordingly, the processor 108 functions as an image zone setting section 144 (FIG. 12) configured to set the image zones 60a', 58a' and 54a'.

Note that, if the heights $h_2$ and $h_3$ are acquired as the information of the heights h in step S12, the processor 108 can extract each zone in the work area 62 for each height h from the image data $ID_1$ by setting a predetermined range for the height h in the same manner as for the distance d, and can set the image zones 60a', 58a' and 54a', similarly.

In step S14, the processor 108 machines the workpiece. Specifically, the operator (or the robot 104) attaches the tool 64 to the machining head 56, and sets the jig on the top surface 60a of the machining table 60. The processor 108 then operates the robot 104 so as to grip the workpiece placed at the predetermined storage place outside the machine tool 50 with the robot hand 120, transports the workpiece to the interior space A of the machine tool 50 through the opening 54c of the splash guard 54, and then sets the workpiece on the jig.

Next, the processor 108 (or the second control device described above) operates the machining head 56 and the machining table 60 in accordance with the machining program so as to machine the workpiece by the tool 64 while injecting the machining fluid from the machining fluid injection device. As a result, foreign matters are deposited in the work area 62 of the machine tool 50. When the machining program is ended, the machining head 56 and the machining table 60 return to the same initial position as at the end of the simulation machining process in step S11. Position data in the robot coordinate system $C_R$ of a workpiece position at which the workpiece is to be placed at the storage place and of a position on the machining table 60 on which the workpiece is to be set is pre-stored in the memory 22.

In step S15, the processor 108 images the work area 62 by the imaging device 14. The processor 108 starts this step S15 at the time $t_2$ when the predetermined time τ elapses from the time $t_1$ at which the machining fluid has been injected from the machining fluid injection device last time in step S14.

Specifically, the processor 108 operates the robot 104 so as to dispose the imaging device 14 at the same imaging position as in step 11, and operates the imaging device 14 so as to image the work area 62 along the same visual line direction as in step 11. The imaging device 14 transmits the captured image data $ID_2$ (second image data) to the processor 108, and the processor 108 stores the image data $ID_2$ in the memory 22.

Figure 18:
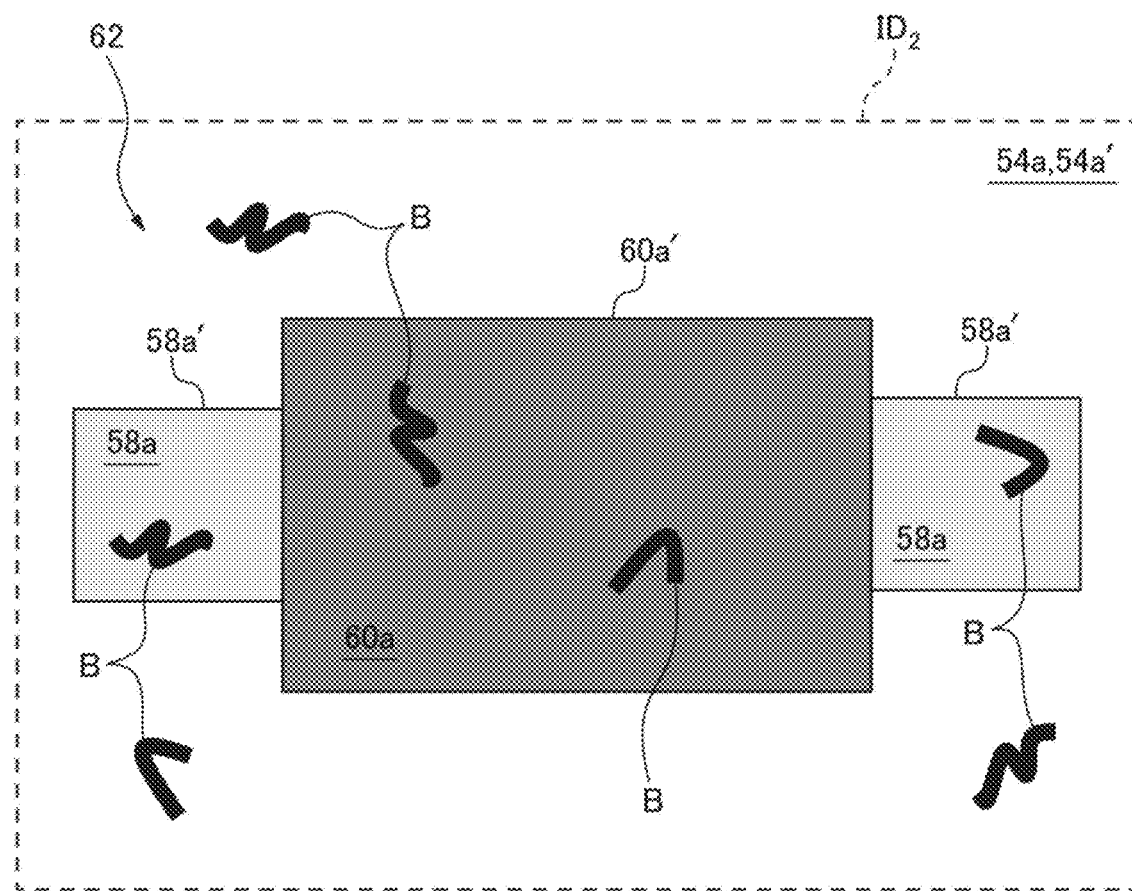
FIG. 18 illustrates an example depicting second image data captured in step S15 in FIG. 16.

This image data $ID_2$ is image data of the work area 62 imaged by the imaging device 14 after the workpiece is machined in step S14. FIG. 18 illustrates an example of the image data $ID_2$ obtained by the imaging device 14 imaging the work area 62 in this step S15. In the image data $ID_2$ imaged after machining, the foreign matters B are shown in the work area 62 (the zones 54a, 58a, and 60a).

In step S16, the processor 108 sets the image zones 54a', 58a' and 60a' in the image data $ID_2$ captured in the most-recent step S15. Specifically, the processor 108 sets the image zones 54a', 58a' and 60a' in the image data $ID_2$ in the same manner as in step S13, based on setting information of the image zones 54a', 58a' and 60a' set in step S13 (e.g., position data of boundary lines of the image zones 54a', 58a' and 60a' in the image data).

As a result, the positions in the image data $ID_1$ of the image zones 54a', 58a' and 60a' set in the image data $ID_1$ in step S13, and the positions in the image data $ID_2$ of the image zones 54a', 58a' and 60a' set in the image data $ID_2$ in this step S16 are the same.

In step S17, the processor 108 determines whether or not it is necessary to clean the zone 60a of height level 3. Specifically, the processor 108 determines whether or not to clean the zone 60a, based on image data $ID_{1\_3}$ of the image zone 60a' of height level 3 in the image data $ID_1$ captured in step S11, and on image data $ID_{2\_3}$ of the image zone 60a' of height level 3 in the image data $ID_2$ captured in the most-recent step S15.

Specifically, the processor 108 may compare brightness of each pixel of the image data $ID_{1\_3}$ before machining with brightness of each pixel of the image data $ID_{2\_3}$ after machining, and may detect whether or not there are the foreign matters in the zone 60a from a difference between them. The processor 108 determines that it is necessary to clean the zone 60a (i.e., determines YES) when the foreign matters in zone 60a are detected in this step S17.

The processor 108 proceeds to step S18 when it determines YES, whereas the processor 108 proceeds to step S19 when it determines NO. Thus, in the present embodiment, the processor 108 functions as a determination section 146 (FIG. 12) configured to determine whether or not to clean the work area 62 (zone 60a), based on the image data $ID_1$, $ID_2$ (specifically, the image data $ID_{1\_3}$, $ID_{2\_3}$).

In step S18, the processor 108 sets a cleaning-target zone. Specifically, the processor 108 sets the zone 60a determined to be cleaned in step S17 as the cleaning-target zone, along with which, the processor 108 also sets the zones 58a and 54a, which are lower in height h than the zone 60a, as the cleaning-target zone, automatically. As a result, the zones 60a, 58a and 54a are set as the cleaning-target zone. Thus, in the present embodiment, the processor 108 functions as a cleaning target zone setting section 148 (FIG. 12).

In step S19, the processor 108 determines whether or not it is necessary to clean the zone 58a of height level 2. Specifically, the processor 108 determines whether or not to clean the zone 58a, based on image data $ID_{1\_2}$ of the image zone 58a' of height level 2 in the image data $ID_1$ captured in step S11, and on image data $ID_{2\_2}$ of the image zone 58a' of height level 2 in the image data $ID_2$ captured in the most-recent step S15.

Specifically, the processor 108 may compare brightness of each pixel of the image data $ID_{1\_2}$ before machining with brightness of each pixel of the image data $ID_{2\_2}$ after machining, and may detect whether or not there are foreign matters in the zone 58a from a difference between them. The processor 108 determines that it is necessary to clean the zone 58a (i.e., determines YES) when the foreign matters in the zone 58a are detected in this step S19. The processor 108 proceeds to step S20 when it determines YES, whereas the processor 108 proceeds to step S21 when it determines NO.

In step S20, the processor 108 sets the cleaning-target zone. Specifically, the processor 108 sets the zone 58a determined to be cleaned in step S19 as the cleaning-target zone, along with which, the processor 108 also sets the zone 54a, which is lower in height h than the zone 58a, as the cleaning-target zone, automatically. Thus, the zones 58a and 54a are set as the cleaning-target zone.

In this way, when the processor 108 determines that it is necessary to clean one zone 60a (or 58a) in step S17 (or S19), in step S18 (or S20), the processor 108 automatically sets the zones 58a and 54a (or 54a) lower in height h than the one zone 60a (or 58a) as the cleaning-target zone, together with the one section 60a (or 58a).

In step S21, the processor 108 determines whether or not it is necessary to clean the zone 54a of height level 1. Specifically, the processor 108 determines whether or not to clean the zone 54a, based on image data $ID_{1\_1}$ of the image zone 54a' of height level 1 in the image data $ID_1$ captured in step S1, and on image data $ID_{2\_1}$ of the image zone 54a' of height level 1 in the image data $ID_2$ captured in the most-recent step S15.

Specifically, the processor 108 may compare brightness of each pixel of the image data $ID_{1\_1}$ before machining with brightness of each pixel of the image data $ID_{2\_1}$ after machining, and detect whether or not there is foreign matters in the zone 54a from a difference between them. The processor 108 determines that it is necessary to clean the zone 54a (i.e., determines YES) when the foreign matters in zone 54a are detected in this step S21. The processor 108 proceeds to step S22 when it determines YES, whereas the processor 108 proceeds to step S24 when it determines NO. In step S22, the processor 108 sets the zone 54a determined to be cleaned in step S21 as the cleaning-target zone.

In step S23, the processor 108 executes the cleaning operation. Specifically, the processor 108 first carries out a detaching operation to cause the robot 104 to grip the cleaning nozzle 16 attached to the attachment device 106 and detach the cleaning nozzle 16 from the attachment device 106. In this detaching operation, the processor 108 operates the robot 104 to move the robot hand 118 (TCP) to a gripping position for gripping the cleaning nozzle 16 held by the claws 138 of the attachment device 106, in a state where the fingers 130 are opened.

When the robot hand 118 is disposed at the gripping position, the cleaning nozzle 16 held by the claws 138 of the attachment device 106 is disposed between the fingers 130 of the robot hand 118, and the flat surface portions 16b of the cleaning nozzle 16 face the inner surfaces of the fingers 130, respectively. Position data of the gripping position in the robot coordinate system $C_R$ is pre-stored in the memory 22.

The processor 108 then closes the fingers 130 to grip the flat surface portions 16b of the cleaning nozzle 16 with the fingers 130. Then, the processor 108 drives the claw drive section 140 of the attachment device 106 so as to open the claws 138. In this way, the robot 104 detaches the cleaning nozzle 16 from the attachment device 106.

After the detaching operation of the cleaning nozzle 16, the processor 108 performs the cleaning operation on the cleaning-target zone set in step S18, S20, or S22. For example, when step S23 is carried out after step S18, the processor 108 performs the cleaning operation on the zones 60a, 58a, and 54a set as the cleaning-target zone in the descending order of height h, i.e., in the order of the zone 60a, the zone 58a, and the zone 54a.

Specifically, the processor 108 operates the fluid supply device 18 so as to inject the fluid from the cleaning nozzle 16 while operating the robot 104 so as to move the cleaning nozzle 16 gripped by the robot hand 118 with respect to the zone 60a, thereby cleaning the entire zone 60a by the injected fluid. The processor 108 then cleans the entire zone 58a by causing the fluid to be injected from the cleaning nozzle 16 while moving the cleaning nozzle 16 with respect to the zone 58a by the robot 104.

The processor 108 then cleans the entire zone 54a by causing the fluid to be injected from the cleaning nozzle 16 while moving the cleaning nozzle 16 with respect to the zone 54a by the robot 104. Note that a movement path (or the cleaning position) in which the robot 104 moves the cleaning nozzle 16 (or TCP) when cleaning each of the zones 60a, 58a, and 54a may be defined in the computer program in advance.

On the other hand, when step S23 is carried out after step S20, the processor 108 performs the cleaning operation on the zones 58a and 54a set as the cleaning-target zone in the descending order of height h, i.e., in the order of the zone 58a, and the zone 54a. Also, when step S23 is carried out after step S22, the processor 108 performs the cleaning operation on the zone 54a.

In this way, the processor 108 performs the cleaning operation to clean the work area 62 by causing the fluid to be injected from the cleaning nozzle 16 while moving the cleaning nozzle 16 with respect to the work area 62 (zones 60a, 58a, and 54a) by the robot 104. Thus, the processor 108 functions as a cleaning execution section 150 (FIG. 12) configured to execute the cleaning operation. After step S23, the processor 108 returns to step S15 and repeats a loop of steps S15 to S23 until it is determined NO in step S21.

Note that the processor 108 may count the number of times "m" for that the processor 108 has performed step S23 (or the number of times for that it has been determined YES in steps S17, S19, or S21), and when the number of times "m" reaches a predetermined number m (e.g., $m_{MAX}=3$), the processor 108 may send an alarm signal in the form of sound or image indicating that "The number of times of cleaning reached predetermined number", and proceed to step S24 (or may end the flow of FIG. 16). Due to this, it is possible to prevent the number of times of execution of step S23 from being too large.

When it is determined NO in step S21, the processor 108 performs an attaching operation to attach the cleaning nozzle 16 to the attachment device. Specifically, the processor 108 operates the robot 104 to dispose the robot hand 118 (TCP) gripping the cleaning nozzle 16 at an attaching position. At this time, the claws 138 of the attachment device 106 are opened.

When the robot hand 118 is disposed at the attaching position, the flat surface portions 138a of the claws 138 of the attachment device 106 face the respective flat surface portions 16b of the cleaning nozzle 16 to be gripped by the robot hand 118. Then, the processor 108 drives the claw drive section 140 of the attachment device 106 so as to close the claws 138 to grip the cleaning nozzle 16, and subsequently, open the fingers 130 of the robot hand 118. In this way, the processor 108 attaches the cleaning nozzle 16 to the attachment device 106 by the robot 104.

In step S24, similarly as in step S8 described above, the processor 108 determines whether or not there is another workpiece to be machined. The processor 108 returns to step S14 when it determines YES, and repeats a loop of steps S14 to 24 until it determines NO in step S24. On the other hand, when the processor 108 determines NO in step S24, it ends the flow illustrated in FIG. 16.

As described above, in the present embodiment, the processor 108 causes the robot 104 to perform the detaching operation of the cleaning nozzle 16 and the cleaning operation on the work area 62. According to this configuration, since the cleaning nozzle 16 can be operated by the robot 104 to perform cleaning of the work area 62 of the machine tool 50, it is possible to improve the efficiency of the cleaning operation.

In addition, in the present embodiment, the cleaning nozzle 16 is provided in the interior space A of the machine tool 50. According to this configuration, since there is no need to carry the cleaning nozzle 16 and the fluid supply tube 26 into and out from the machine tool 50, it is possible to improve the efficiency of the cleaning operation, while preventing the fluid for cleaning from leaking from the cleaning nozzle 16 or the fluid supply tube 26 to the outside of the machine tool 50. In addition, piping of the fluid supply tube 26 in the interior space A of the machine tool 50 can be simplified.

Further, in this embodiment, when it is determined that it is necessary to clean one zone 60a (or 58a), the processor 108 automatically sets, as the cleaning-target zone (steps S18 and S20), the zones 58a and 54a (or 54a) which are lower in height h than the one zone 60a (or 58a), together with the one zone 60a (or 58a).

Then, the processor 108 performs the cleaning operation on the zones 60a, 58a, and 54a set as the cleaning-target zone, in the descending order of height h. According to this configuration, the processor 108 can optimize the number of cleaning operations for the work area 62. In particular, the foreign matters B, which are blown off when one zone is cleaned by the fluid injected from the cleaning nozzle 16, can eventually accumulate in a zone lower in height than the one zone by the actin of gravity.

Accordingly, if the zone 60a is cleaned after the zone 58a, the foreign matters B blown away from the zone 60a may be deposited in the cleaned zone 58a. By carrying out the cleaning operation on the plurality of zones 60a, 58a, and 54a in the descending order of height h, it is possible to efficiently clean the plurality of zones 60a, 58a, and 54a.

Furthermore, in the present embodiment, the robot 104 includes the robot hand 118 for gripping the cleaning nozzle and the robot hand 120 for workpiece loading. Thus, a variety of operations can be performed by the single robot 104, and therefore it is possible to improve work efficiency and reduce a manufacturing cost. Note that, in the flow illustrated in FIG. 16, the processor 108 may execute a loop of steps S15 to S23 every time a total of "n" workpieces are machined (e.g., n=20).

Figure 19:
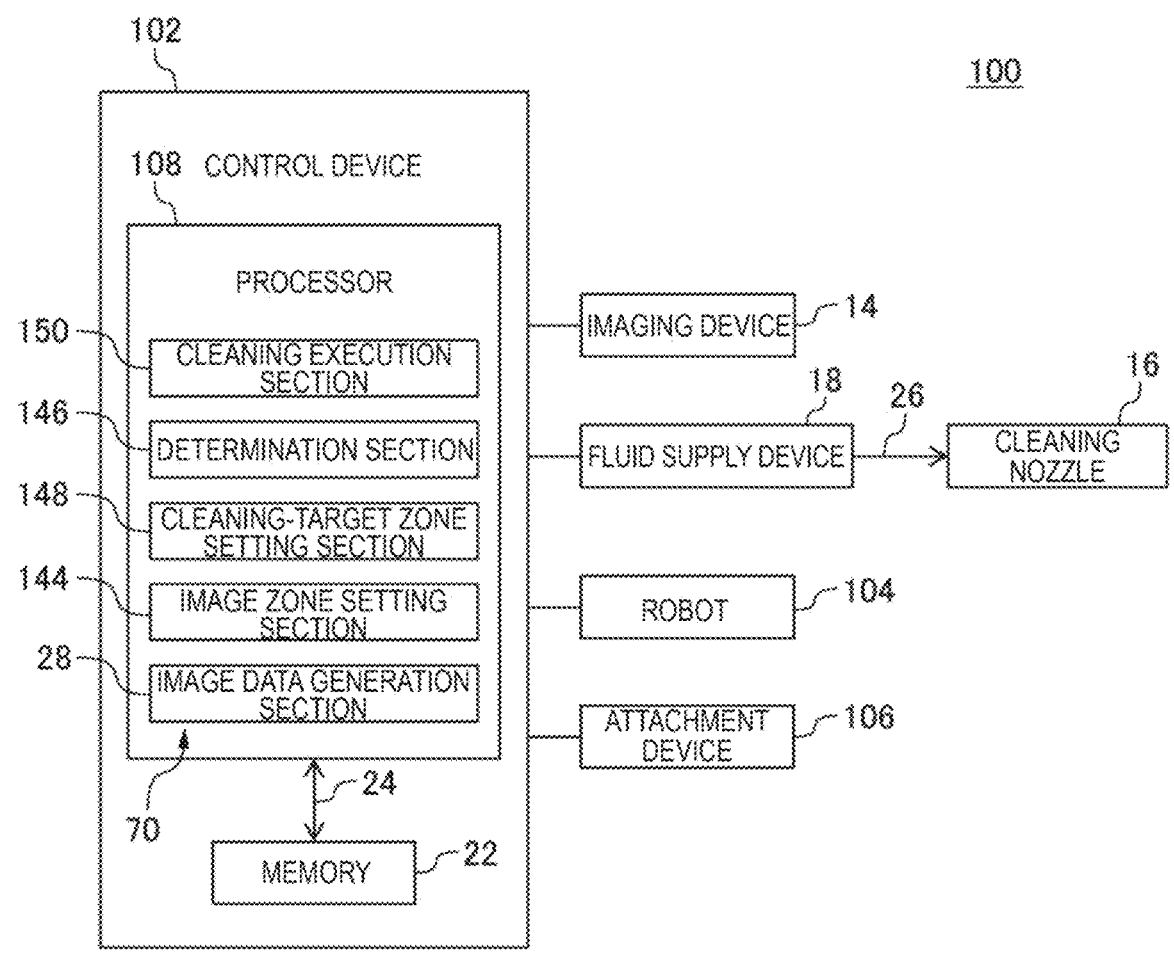
FIG. 19 is a block diagram illustrating another example of a function of the cleaning system illustrated in FIG. 12.

Note that the above-described device 70 can be applied to the cleaning system 100. Below, with reference to FIG. 19, another function of the cleaning system 100 will be described. In the present embodiment, the processor 108 functions as the image data generation section 28. Accordingly, the imaging device 14, the image data generation section 28, and the determination section 146 constitute the device 70.

Next, another example of the operation of the cleaning system 100 will be described with reference to FIG. 20. A flow illustrated in FIG. 20 differs from the flow illustrated in FIG. 16 in steps S31, S32, and S33. Specifically, after step S16, in step S31, the processor 108 executes a cleaning determination scheme for height level 3. This step S31 will be described with reference to FIG. 21.

In step S41, the processor 108 functions as the image data generation section 28 to generate image data $ID_{3\_3}$ (the third image data) indicating a degree of change in brightness between image data $ID_{1\_3}$ of the image zone 60a' of height level 3 in the image data $ID_1$ captured in step S11, and image data $ID_{2\_3}$ of the image zone 60a' of height level 3 in the image data $ID_2$ captured in the most-recent step S15.

Specifically, similarly to step S4 described above, the processor 108 generates the image data $ID_{3\_3}$ having the number of pixels the same as the image data $ID_{1\_3}$ and the image data $ID_{2\_3}$, by calculating the brightness $BR_3$ of each pixel of the image data $ID_{3\_3}$ using Equation (1), Equation (2), or Equation (3). The brightness $BR_3$ of each pixel of the image data $ID_{3\_3}$ is a value corresponding to the degree of change between the brightness $BR_1$ of the pixel of the image data $ID_{1\_3}$ and the brightness $BR_2$ of the pixel of the image data $ID_{2\_3}$ which corresponds to the pixel of the image data $ID_{1\_3}$.

In step S42, the processor 108 acquires a histogram $HG_3$ of the image data $ID_{3\_3}$ generated in step S41. The histogram $HG_3$ is data indicating a relationship between the brightness $BR_3$ of each pixel of the image data $ID_{3\_3}$ and the number of pixels N of the image data $ID_{3\_3}$. In step S43, the processor 108 functions as the determination section 146 to determine whether or not to clean the zone 60a of height level 3 based on the histogram $HG_3$, using the same technique as above-described step S6.

As an example, similarly to step S6 described above, the processor 108 determines that it is necessary to clean the zone 60a of height level 3 (i.e., determines YES) when a rate $R_{1\_3}$ of the number of pixels $N_{X\_3}$ having the brightness $BR_3$ being within a predetermined range $[\alpha_{1\_3}, \alpha_{2\_3}]$ with respect to a total number of pixels $N_{T\_3}$ (i.e., $R_{1\_3}=N_{X\_3}/N_{T\_3}$) in the histogram $HG_3$ is equal to or smaller than a predetermined threshold value $R_{th1\_3}$. As another example, the processor 108 determines YES when a rate $R_{2\_3}$ of the number of pixels $N_{Y\_3}$ having the brightness $BR_3$ being out of the predetermined range $[\alpha_{1\_3}, \alpha_{2\_3}]$ with respect to the total number of pixels $N_{T\_3}$ (i.e., $R_{2\_3}=N_{Y\_3}/N_{Y\_3}$) in the histogram $HG_3$ is equal to or larger than a predetermined threshold value $R_{th2\_3}$.

As yet another example, the processor 108 determines YES when a matching degree between a locus of a graph line in the histogram $HG_3$ and a locus of a graph line in a reference histogram $HG_{R\_3}$ is smaller than a predetermined threshold value. As yet another example, the processor 108 determines YES when a standard deviation of the histogram $HG_3$ is larger than a predetermined threshold value. The processor 108 proceeds to step S18 in FIG. 20 when it determines YES in this step S43, whereas the processor 108 proceeds to step 32 in FIG. 20 when it determines NO.

Figure 22:
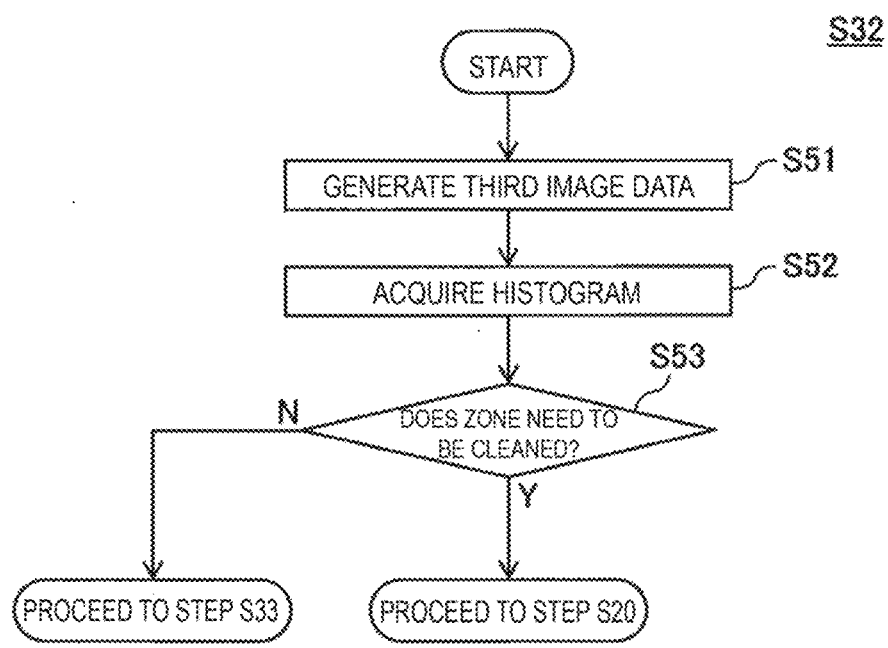
FIG. 22 is a flowchart illustrating an example of the process of step S32 of FIG. 20.

In step S32, the processor 108 executes a cleaning determination scheme for height level 2. This step S32 will be described with reference to FIG. 22. In step S51, the processor 108 functions as the image data generation section 28 to generate image data $ID_{3\_2}$ (third image data) indicating a degree of change in brightness between the image data $ID_{1\_2}$ of the image zone 58a' of height level 2 in the image data $ID_2$ captured in step S11, and the image data $ID_{2\_2}$ of the image zone 58a' of height level 2 in the image data $ID_2$ captured in the most-recent step S15.

Specifically, similarly to above-described step S4, the processor 108 generates the image data $ID_{3\_2}$ having the number of pixels the same as the image data $ID_{2\_2}$ and the image data $ID_{2\_2}$, by calculating the brightness $BR_3$ of each pixel of the image data $ID_{3\_2}$, using Equation (1), Equation (2), or Equation (3). The brightness $BR_3$ of each pixel of the image data $ID_{3\_2}$ is a value corresponding to the degree of change between the brightness $BR_2$ of the pixel of the image data $ID_{1\_2}$ and the brightness $BR_2$ of the pixel of the image data $ID_{2\_2}$ which corresponds to the pixel of the image data $ID_{1\_2}$.

In step S52, the processor 108 acquires a histogram $HG_2$ of the image data $ID_{3\_2}$ generated in step S51. The histogram $HG_2$ is data indicating a relationship between the brightness $BR_3$ of each pixel of the image data $ID_{3\_2}$ and the number of pixels N of the image data $ID_{3\_2}$. In step S53, the processor 108 functions as the determination section 146 to determine whether or not to clean the zone 58a of height level 2, based on the histogram $HG_2$.

As an example, similarly to step S6 described above, the processor 108 determines that it is necessary to clean the zone 58a of height level 2 (i.e., determines YES) when a rate $R_{1\_2}$ of the number of pixels $N_{X\_2}$ having the brightness $BR_3$ being within a predetermined range $[\alpha_{1\_2}, \alpha_{2\_2}]$ with respect to the total number of pixels $N_{T\_2}$ (i.e., $R_{1\_2}=N_{X\_2}/N_{T\_2}$) in the histogram $HG_2$ is equal to or smaller than a predetermined threshold value $R_{th1\_2}$. As another example, the processor 108 determines YES when a rate $R_{2\_2}$ of the number of pixels $N_{Y\_2}$ having the brightness $BR_3$ being out of the range $[\alpha_{1\_2}, \alpha_{2\_2}]$ with respect to the total number of pixels $N_{T\_2}$ (i.e., $R_{2\_2}=N_{Y\_2}/N_{T\_2}$) in the histogram $HG_2$ is equal to or larger than a predetermined threshold value $R_{th2\_2}$.

As yet another example, the processor 108 determines YES when a matching degree between a locus of a graph line in the histogram $HG_2$ and a locus of a graph line of a reference histogram $HG_{R\_2}$ is smaller than a predetermined threshold value. As yet another example, the processor 108 determines YES when a standard deviation of the histogram $HG_2$ is larger than a predetermined threshold value. The processor 108 proceeds to step S20 in FIG. 20 when determining YES in this step S53, while the processor 108 proceeds to step S33 in FIG. 20 when determining NO.

Figure 23:
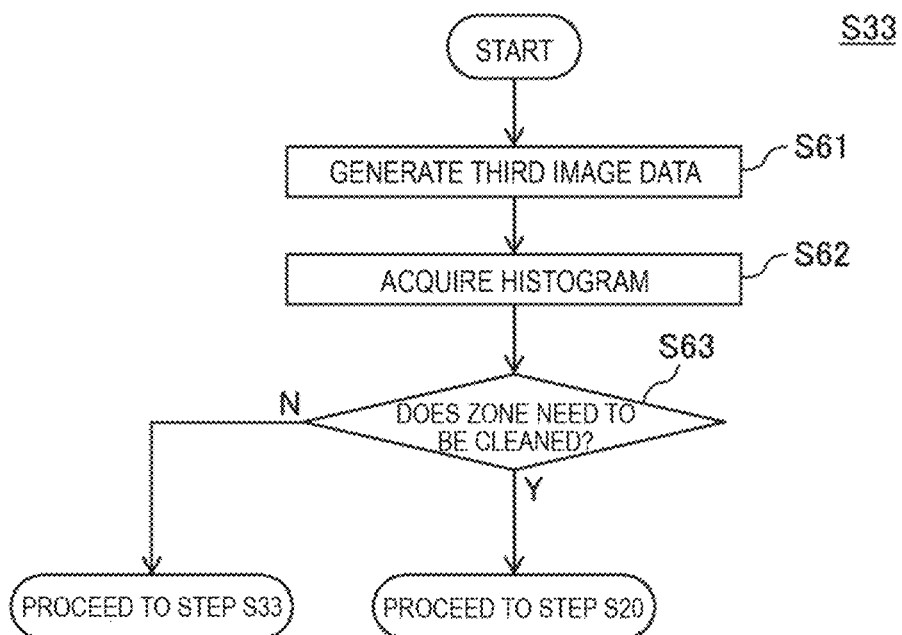
FIG. 23 is a flowchart illustrating an example of the process of step S33 in FIG. 20.

In step S33, the processor 108 executes a cleaning determination scheme for height level 1. This step S33 will be described with reference to FIG. 23. In step S61, the processor 108 functions as the image data generation section 28 to generate image data $ID_{3\_1}$ (third image data) indicating a degree of change in brightness between the image data $ID_{1\_1}$ of the image zone 54a' of height level 1 in the image data $ID_1$ captured in step S11, and the image data $ID_{2\_1}$ of the image zone 54a' of height level 1 in the image data $ID_2$ captured in the most-recent step S15.

Specifically, similarly to step S4 described above, the processor 108 generates the image data $ID_{3\_1}$ having the number of pixels the same as the image data $ID_{1\_1}$ and the image data $ID_{2\_1}$, by calculating the brightness $BR_3$ of each pixel of the image data $ID_{3\_1}$, using Equation (1), Equation (2), or Equation (3). The brightness $BR_3$ of each pixel of the image data $ID_{3\_1}$ is a value corresponding to the degree of change between the brightness $BR_1$ of the pixel of the image data $ID_{1\_1}$ and the brightness $BR_2$ of the pixel of the image data $ID_{2\_1}$ which corresponds to the pixel of the image data $ID_{1\_1}$.

In step S62, the processor 108 acquires the histogram $HG_1$ of the image data $ID_{3\_1}$ generated in step S61. The histogram $HG_1$ is data indicating a relationship between the brightness $BR_3$ of each pixel of the image data $ID_{3\_1}$ and the number of pixels N of the image data $ID_{3\_1}$. In step S63, the processor 108 functions as the determination section 146 to determine whether or not to clean the zone 54a of height level 1 based on the histogram $HG_1$.

As an example, similarly to step S6 described above, the processor 108 determines that it is necessary to clean the zone 54a of height level 1 (i.e., determines YES) when a rate $R_{1\_1}$ of the number of pixels $N_{X\_1}$ having the brightness $BR_3$ being within a predetermined range $[\alpha_{1\_1}, \alpha_{2\_1}]$ with respect to the total number of pixels $N_{X\_1}$ (i.e., $R_{1\_1}=N_{X\_1}/N_{X\_1}$) in the histogram $HG_1$ is equal to or smaller than a predetermined threshold value $R_{th1\_1}$. As another example, the processor 108 determines YES when a rate $R_{2\_1}$ of the number of pixels $N_{Y\_1}$ having the brightness $BR_3$ being out of the range $[\alpha_{1\_1}, \alpha_{2\_1}]$ with respect to the total number of pixels $N_{T\_1}$ (i.e., $R_{2\_1}=N_{Y\_1}/N_{T\_1}$) in the histogram $HG_1$ is equal to or larger than a predetermined threshold value $R_{th2\_1}$.

As yet another example, the processor 108 determines YES when a matching degree between a locus of a graph line of the histogram $HG_1$ and a locus of a graph line of a reference histogram $HG_{R\_1}$ is smaller than a predetermined threshold value. As yet another example, the processor 108 determines YES when a standard deviation of the histogram $HG_1$ is larger than a predetermined threshold value. The processor 108 proceeds to step S22 in FIG. 20 when determining YES in this step S63, whereas the processor 108 proceeds to step S24 in FIG. 20 when determining NO.

Thus, in the present embodiment, the processor 108 acquires the histograms $HG_3$, $HG_2$, and $HG_1$ for the respective image zones 60a', 58a', and 54a' set in step S16, and determines whether or not to clean the zones 60a, 58a, and 54a respectively, based on the acquired histograms $HG_3$, $HG_2$, and $HG_1$. According to this configuration, it is possible to determine whether or not to clean each of the zones 60a, 58a, and 54a with high accuracy, by means of a statistical technique.

Figure 24:
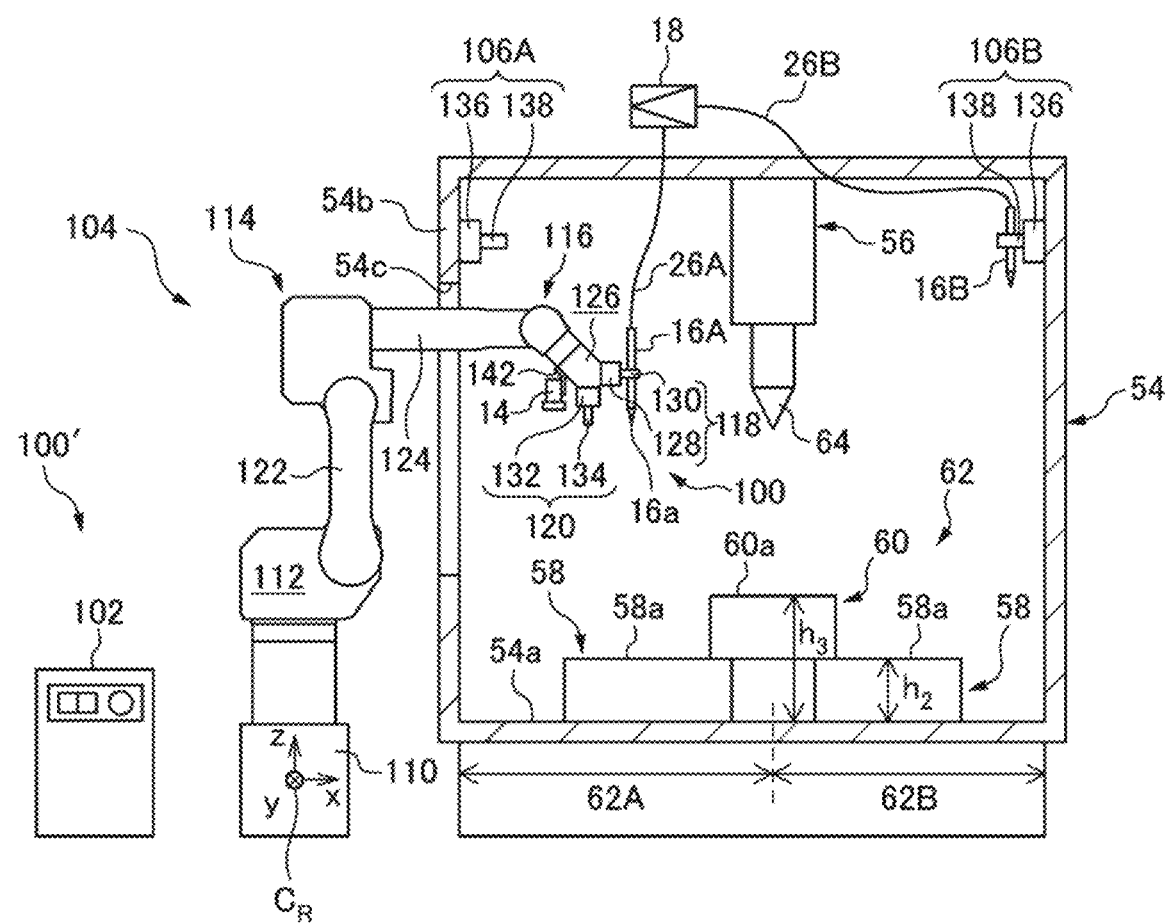
FIG. 24 is a schematic view of a cleaning system according to still another embodiment.

Note that the cleaning system 100 may include a plurality of cleaning nozzles and a plurality of attachment devices. Such an embodiment is illustrated in FIG. 24. The cleaning system 100' illustrated in FIG. 24 differs from the above-described cleaning system 100 in that the cleaning system 100' includes a plurality of cleaning nozzles 16A and 16B, and a plurality of attachment devices 106A and 106B. The fluid supply device 18 supplies fluid to the cleaning nozzle 16A through a fluid supply tube 26A, and supplies fluid to the cleaning nozzle 16B through a fluid supply tube 26B.

The attachment devices 106A and 106B are provided on the side walls 54b of the splash guard 54, which face each other in the x-axis direction of the robot coordinate system $C_R$. The cleaning nozzle 16A is detachably attached to the attachment device 106a, while the cleaning nozzle 16B is detachably attached to the attachment device 106B.

The processor 108 divides the work area 62 into an area 62A on the x-axis negative direction side of the robot coordinate system $C_R$, and an area 62B on the x-axis positive direction side of the robot coordinate system $C_R$. The processor 108 causes the robot 104 to grip the cleaning nozzle 16B and clean the work area 62 by the cleaning nozzle 16B, after (or before) causing the robot 104 to grip the cleaning nozzle 16A and cleaning the area 62A by the cleaning nozzle 16A.

Figure 20:
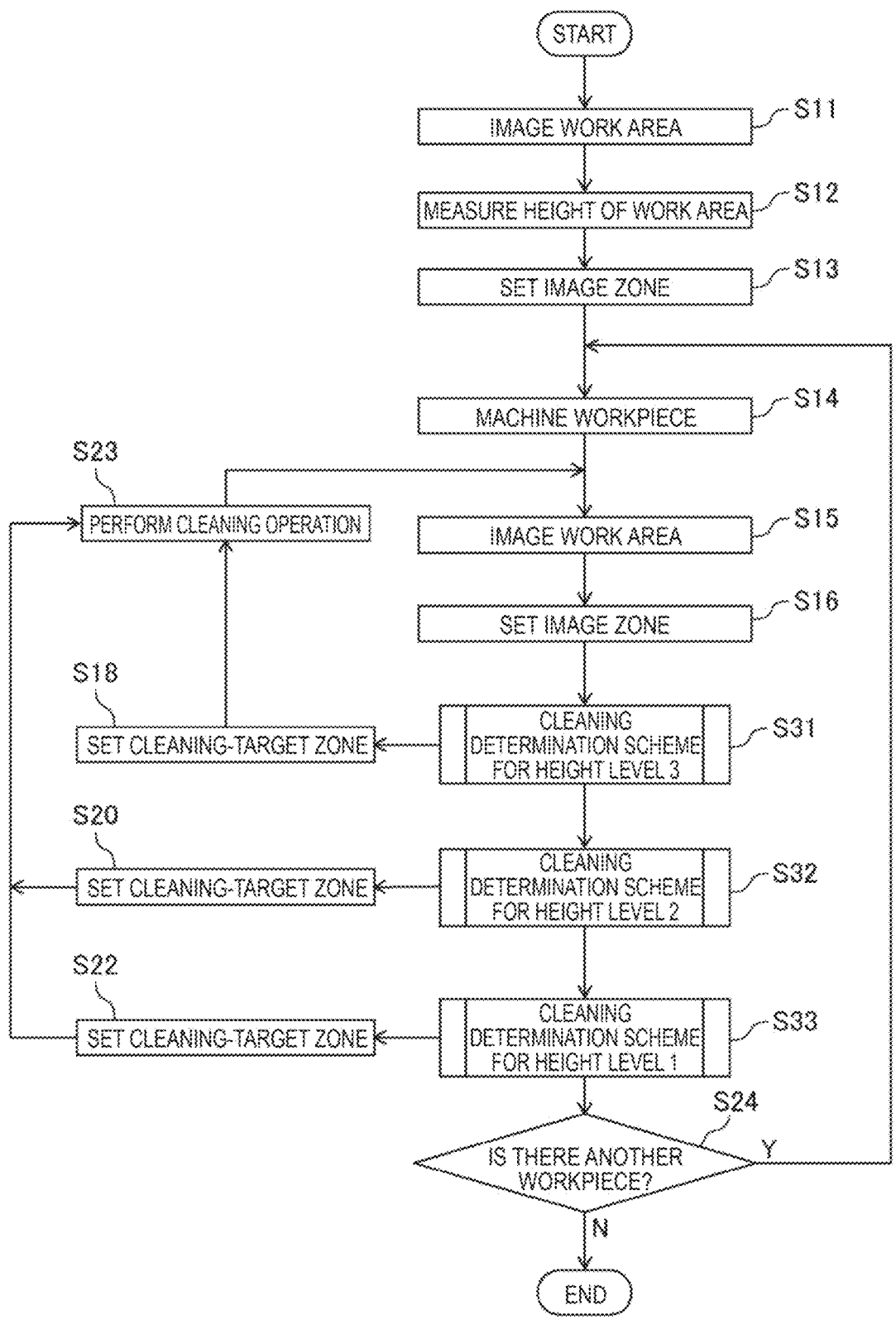
FIG. 20 is a flowchart illustrating an example of an operation process of the cleaning system illustrated in FIG. 19.
Figure 21:
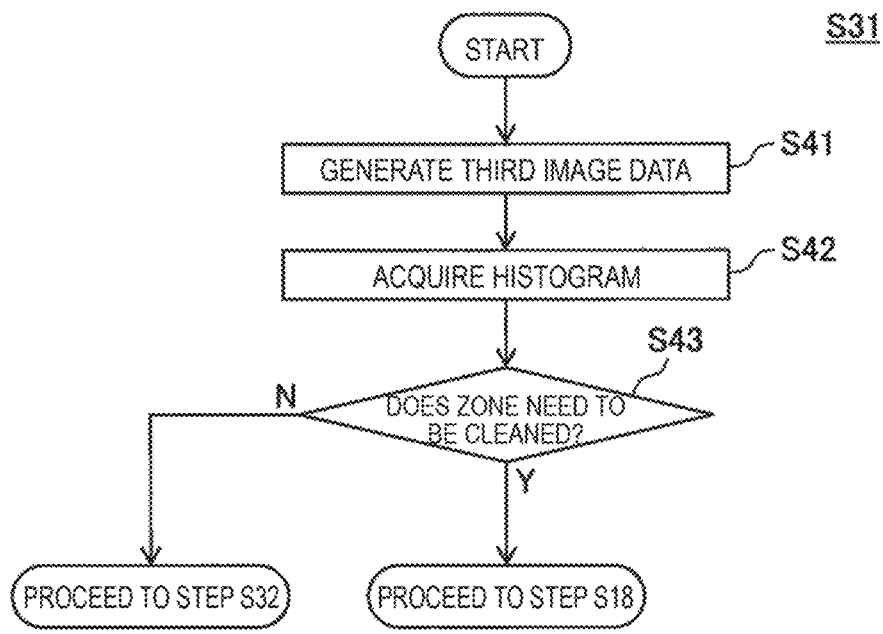
FIG. 21 is a flowchart illustrating an example of the process of step S31 in FIG. 20.

For example, the processor 108 cleans each of the areas 62A and 62B by executing the flow illustrated in FIG. 16 or FIG. 20 for each of the areas 62A and 62B. When executing the flow illustrated in FIG. 16 or FIG. 20 for the area 62A, in steps S11 and S15, the processor 108 images the area 62A by the imaging device 14.

On the other hand, when executing the flow illustrated in FIG. 16 or FIG. 20 for the area 62B, in steps S11 and S15, the processor 108 images the area 62B by the imaging device 14. According to the present embodiment, it is possible to reliably perform the cleaning operation on each of the areas 62A and 62B of the work area 62, using the corresponding cleaning nozzles 16A and 16B.

In the cleaning system 100 or 100' described above, the imaging device 14 is a three-dimensional vision sensor capable of measuring a distance to an object. However, the cleaning system 100 or 100' may further include a height measurement instrument for measuring the height h of the work area 62, wherein the imaging device 14 may be a camera capable of capturing image data.

In the embodiments described above, the work area 62 includes the zones 54a, 58a, and 60a of three height levels. However, it should be understood that the work area 62 may include zones of any number of height levels. In the embodiments described above, the bottom wall 54a, the telescopic cover 58, and the machining table 60 are exemplified as elements constituting the zones 54a, 58a, and 60a of different height levels. However, the work area 62 may have any element other than the bottom wall 54a, the telescopic cover 58, and the machining table 60.

The cleaning system 10, 100, or 100' described above may include a plurality of imaging devices 14A and 14B. For example, the imaging device 14A may image a part of the work area 62 (e.g., the area 62A described above), while the imaging device 14B may image the other part of the work area 62 (e.g., the area 62B described above).

Further, a light source for assisting image-capturing (not illustrated) may be provided for increasing light emitted to the work area 62 when imaging the work area 62 by the imaging device 14, 14A or 14B in the above-described steps S1, S3, S11, or S15. The light source for assisting image-capturing may be a fluorescent lamp, an LED, or the like, and may be integrally incorporated in the imaging device 14, 14A or 14B, or may be provided separate from the imaging device 14, 14A or 14B.

In the embodiments described above, the processor 20 performs the simulation machining process in steps S1 and S11. However, if the machining fluid is not used in the above-described step S2 or S14 for example, the processor 20 may cause the imaging device 14 to image the work area 62 without performing the simulation machining process in step S1 or S11.

Further, in the simulation machining process performed in step S1 or S11 described above, a dummy workpiece having any shape, with which the tool 64 does not contact during the simulation machining process, may be used. Further, in step S1 or S11, after the simulation machining process is performed, the dummy workpiece is removed and then the image of the work area 62 may be captured, and subsequently, in step S3 or S15 described above, after the workpiece machined in step S2 or S14 is removed from the jig and then the image of the work area 62 may be captured.

When the cleaning system 100 executes the flow illustrated in FIG. 16, the image data $ID_1$ indicating the state before machining is not necessarily imaged by the imaging device 14 in step S11, but may be created by an operator as image data of computer graphics, for example. The robot 104 describe above may be any type of robot, such as a horizontal articulated robot, and a parallel link robot. Although the present disclosure has been described through the above embodiments, the above embodiments are not intended to limit the claimed invention.

The invention claimed is:

1. A device configured to determine whether or not it is necessary to clean a work area of a machine tool, the device comprising:
an imaging device configured to image first image data of the work area before the machine tool machines a workpiece in the work area, and to image second image data of the work area after the machine tool machines the workpiece in the work area;
a processor having a plurality of sections, including:
an image data generation section configured to generate third image data including pixels, each of the pixels having brightness corresponding to a degree of change between brightness of a pixel of the first image data and brightness of a pixel of the second image data which corresponds to the pixel of the first image data, wherein the degree of change between the brightness of the pixel of the first image data and the brightness of the pixel of the second image data is caused by a presence of foreign matter on the work area after the machine tool machines the workpiece; and
a determination section configured to determine whether or not to clean the work area based on a histogram statistically indicating a relationship between the brightness of the pixels of the third image data and the number of the pixels of the third image detail;
the processor being configured to perform cleaning of the work area:
when a rate of the number of pixels having brightness within a predetermined range with respect to a total number of pixels in the histogram is equal to or lower than a predetermined threshold value, or
when a rate of the number of pixels having brightness out of the predetermined range with respect to the total number of pixels in the histogram is equal to or larger than a predetermined threshold value.

2. The device of claim 1, wherein the image data generation section is configured to generate the third image data such that each pixel of the third image data has the brightness calculated based on a difference between the brightness of the pixel of the first image data and the brightness of the pixel of the second image data.

3. The device of claim 1, wherein the image data generation section is configured to generate the third image data such that each pixel of the third image data has the brightness calculated based on a ratio of the brightness of the pixel of the first image data and the brightness of the pixel of the second image data.

4. A cleaning system of a machine tool, comprising:
the device of claim 1; and
a cleaning nozzle configured to inject fluid to the work area so as to clean the work area when the determination section determines that it is necessary to clean the work area.

5. A method of determining whether or not it is necessary to clean a work area of a machine tool, the method comprising:
imaging first image data of the work area by an imaging device before the machine tool machines a workpiece in the work area;
imaging second image data of the work area by the imaging device after the machine tool machines the workpiece in the work area;
generating, by a processor, third image data including pixels, each of the pixels having brightness corresponding to a degree of change between brightness of a pixel of the first image data and brightness of a pixel of the second image data which corresponds to the pixel of the first image data, wherein the degree of change between the brightness of the pixel of the first image data and the brightness of the pixel of the second image data is caused by a presence of foreign matter on the work area after the machine tool machines the workpiece;
determining, by the processor, whether or not to clean the work area based on a histogram statistically indicating a relationship between the brightness of the pixels of the third image data and the number of the pixels of the third image data; and
cleaning the work area:
when a rate of the number of pixels having brightness being within a predetermined range with respect to a total number of pixels in the histogram is equal to or lower than a predetermined threshold value, or
when a rate of the number of pixels having brightness being out of the predetermined range with respect to the total number of pixels in the histogram is equal to or larger than a predetermined threshold value.

6. The device of claim 1, wherein the processor is further configured to calculate the brightness of each pixel of the third image data from Equation (2) of $BR_3 = (BR_1 - BR_2)/2+$ 128, wherein $BR_1$ is the brightness of the first image data and $BR_2$ is the brightness of the second image data.

7. The device of claim 1, wherein the processor is further configured to calculate the brightness of each pixel of the third image data from Equation (3) of $BR_3=(BR_2+1)/(BR_1+1)$, wherein $BR_1$ is the brightness of the first image data and $BR_2$ is the brightness of the second image data.

\* \* \* \* \*